US008660361B2

(12) United States Patent
Yu et al.

(10) Patent No.: US 8,660,361 B2
(45) Date of Patent: Feb. 25, 2014

(54) IMAGE PROCESSING DEVICE AND RECORDING MEDIUM STORING IMAGE PROCESSING PROGRAM

(75) Inventors: Shanshan Yu, Kawasaki (JP); Satoshi Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 116 days.

(21) Appl. No.: 13/309,619

(22) Filed: Dec. 2, 2011

(65) Prior Publication Data

US 2012/0141033 A1    Jun. 7, 2012

(30) Foreign Application Priority Data

Dec. 3, 2010    (JP) .................................. 2010-270538

(51) Int. Cl.
    *G06K 9/46*    (2006.01)
(52) U.S. Cl.
    USPC ........................................................ 382/195
(58) Field of Classification Search
    USPC .......... 382/103, 115, 117–118, 154, 181, 190
    See application file for complete search history.

(56) References Cited

U.S. PATENT DOCUMENTS

| 6,496,594 | B1 * | 12/2002 | Prokoski ........................ 382/118 |
| 7,873,190 | B2 * | 1/2011 | Yuasa et al. ................... 382/118 |
| 8,208,732 | B2 * | 6/2012 | Nakamura ..................... 382/190 |
| 8,254,691 | B2 * | 8/2012 | Kaneda et al. ................ 382/195 |
| 2010/0189358 | A1 | 7/2010 | Kaneda et al. |

FOREIGN PATENT DOCUMENTS

| JP | 2007-233997 A | 9/2007 |
| JP | 2008-310775 A | 12/2008 |

* cited by examiner

*Primary Examiner* — Jose Couso
(74) *Attorney, Agent, or Firm* — Fujitsu Patent Center

(57) ABSTRACT

An image processing device includes a storage unit that stores dictionary information; a generating unit that extracts, from an input image, a plurality of characteristic point candidates, and generates a plurality of combinations that each include a plurality of characteristic point candidates; a removing unit that removes, for each of the combinations, at least one characteristic point candidate based on at least one of the dictionary information and information obtained by analyzing the input image; and a determining unit that acquires, for each of the combinations, results of matching the dictionary information with the combination of which the at least one characteristic point candidate has been removed, selects a combination of characteristic point candidates based on the acquired matching results, and determines, as the characteristic points, the plurality of characteristic point candidates included in the selected combination.

9 Claims, 18 Drawing Sheets

FIG. 2

| PAIR OF CHARACTERISTIC POINTS | DISTANCE (LINK LENGTH) BETWEEN CHARACTERISTIC POINTS |
|---|---|
| RIGHT PUPIL⇔LEFT PUPIL | 1.0 |
| RIGHT PUPIL⇔TIP OF NOSE | 0.6 |
| LEFT PUPIL⇔TIP OF NOSE | 0.6 |
| RIGHT PUPIL⇔RIGHT NARIS | 0.7 |
| LEFT PUPIL⇔LEFT NARIS | 0.7 |
| RIGHT PUPIL⇔RIGHT MOUTH CORNER | 1.2 |
| LEFT PUPIL⇔LEFT MOUTH CORNER | 1.2 |
| TIP OF NOSE⇔RIGHT NARIS | 0.2 |
| TIP OF NOSE⇔LEFT NARIS | 0.2 |
| RIGHT NARIS⇔LEFT NARIS | 0.15 |
| RIGHT NARIS⇔RIGHT MOUTH CORNER | 0.25 |
| LEFT NARIS⇔LEFT MOUTH CORNER | 0.25 |
| RIGHT MOUTH CORNER⇔LEFT MOUTH CORNER | 0.3 |

FIG. 3
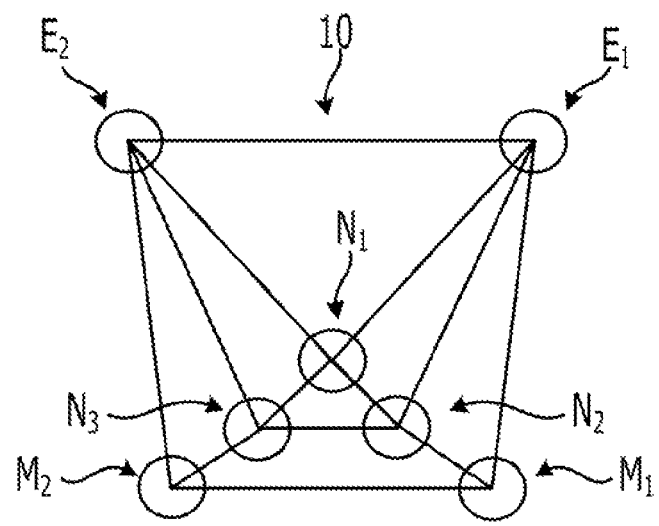
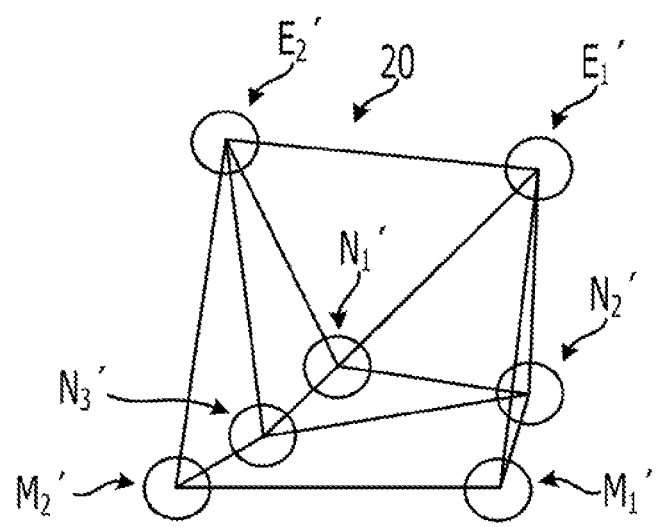

IMAGE PROCESSING DEVICE AND RECORDING MEDIUM STORING IMAGE PROCESSING PROGRAM

CROSS-REFERENCE TO RELATED APPLICATIONS

This application is based upon and claims the benefit of priority of the prior Japanese Patent Application No. 2010-270538, filed on Dec. 3, 2010, the entire contents of which are incorporated herein by reference.

FIELD

Various embodiments described herein relate to an image processing device and a medium for recording an image processing program.

BACKGROUND

There is a technique for extracting a plurality of characteristic point candidates from an input image and detecting characteristic points from the extracted characteristic point candidates in order to use the characteristic points for a process to be performed by an information processing device. Japanese Laid-Open Patent Publication No. 2007-233997 discusses that when a pupil is to be detected as a characteristic point from an input image obtained by imaging a person's face, positional relationships between the pupil and other characteristic points such as a mouth corner and a naris are used. For example, in a process using this technique, a plurality of characteristic point candidates that can be characteristic points such as pupils, mouth corners and nares are extracted from an input image obtained by imaging a person's face. In the process, a plurality of combinations of the characteristic point candidates such as the pupils, the mouth corners and the nares are then generated and compared with a model in which positional relationships among characteristic points such as pupils, mouth corners and nares are defined. In the process, as a result of the comparison, characteristic point candidates that are included in a combination that best matches the model are determined as characteristic points such as the pupils, the mouth corners and the nares.

The positions of the pupils that are detected as the characteristic points from the input image are used for the following processes. For example, the positions of the pupils are used for the process in which an information processing device such as a mobile phone or a personal computer tracks movements of the pupils of a user, captures a line of sight of the user, and scrolls a screen displayed on a display or the like on the basis of a movement of the line of sight. In addition, the positions of the pupils are used for the process in which an electronic device that is installed in a vehicle tracks movements of the pupils of a driver, captures a line of sight of the driver, and provides an alarm when the device detects that the driver looks away from a road.

SUMMARY

According to an aspect of the invention, an image processing device includes a storage unit that stores dictionary information; a generating unit that extracts, from an input image, a plurality of characteristic point candidates, and generates a plurality of combinations that each include a plurality of characteristic point candidates; a removing unit that removes, for each of the combinations, at least one characteristic point candidate based on at least one of the dictionary information and information obtained by analyzing the input image; and a determining unit that acquires, for each of the combinations, results of matching the dictionary information with the combination of which the at least one characteristic point candidate has been removed, selects a combination of characteristic point candidates based on the acquired matching results, and determines, as the characteristic points, the plurality of characteristic point candidates included in the selected combination.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram explaining a model storage unit according to the first embodiment.

FIG. 3 is a diagram explaining a removing unit according to the first embodiment.

DESCRIPTION OF EMBODIMENTS

Figure 1:
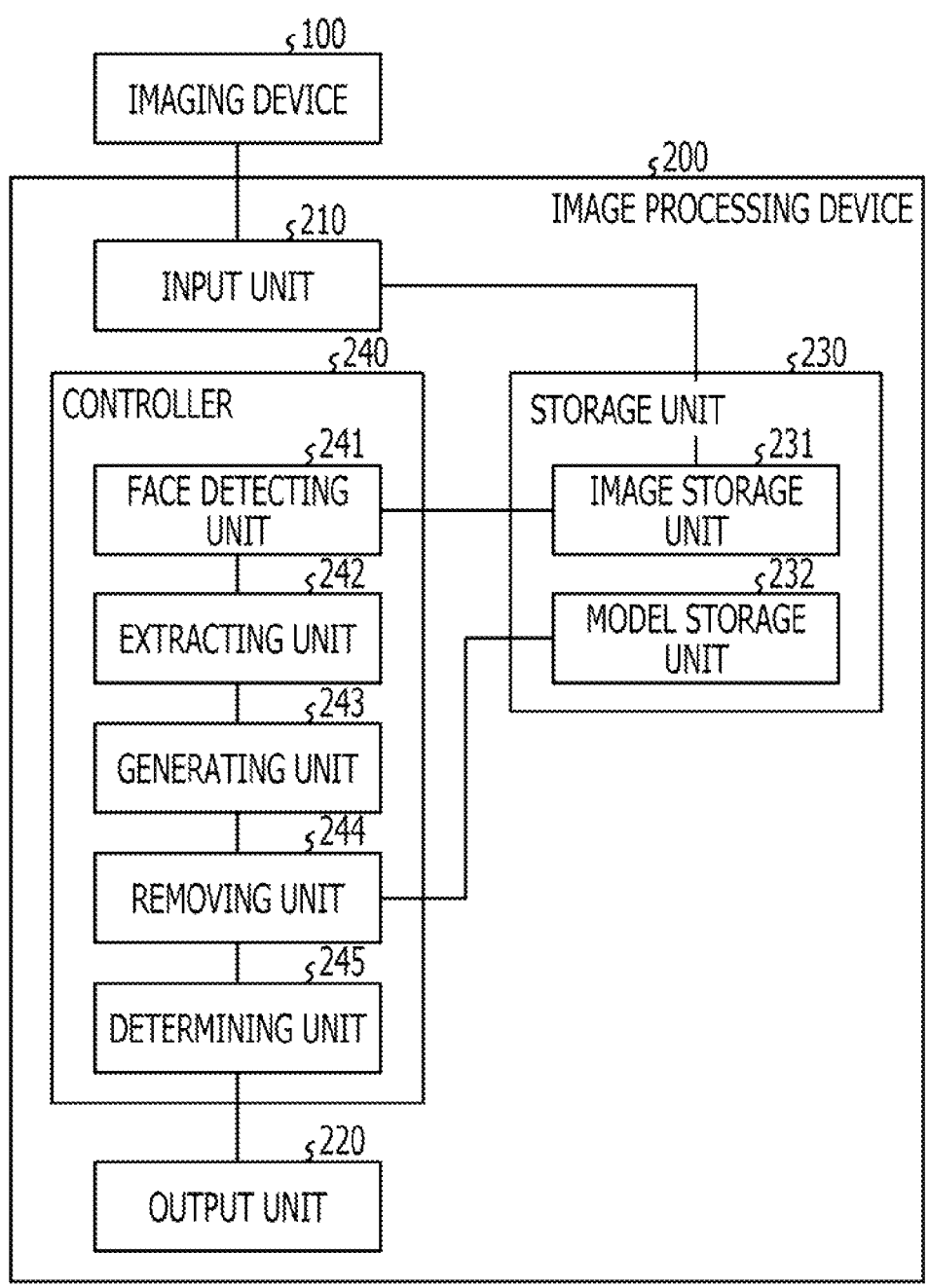
FIG. 1 is a functional block diagram illustrating a configuration of an image processing device according to a first embodiment.
Figure 4:
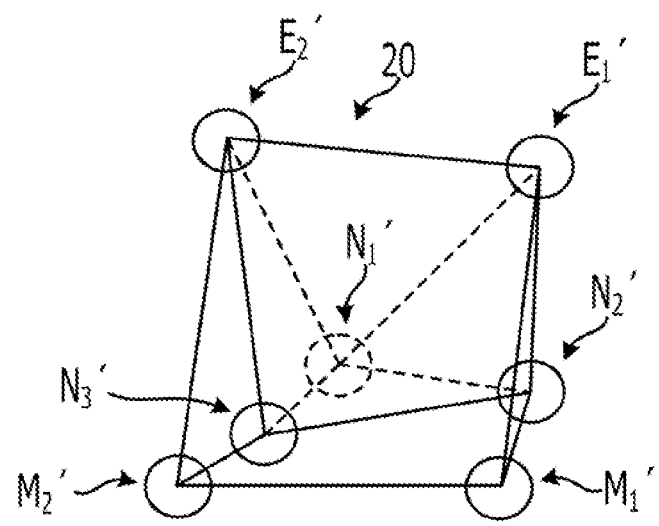
FIG. 4 is a diagram explaining the removing unit according to the first embodiment.
Figure 5:
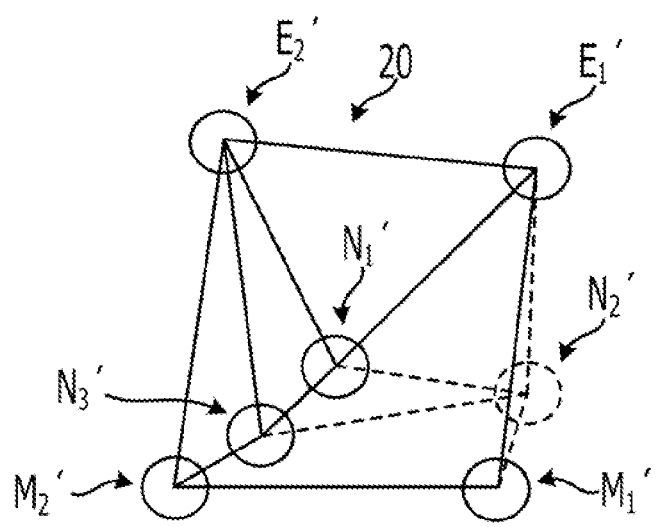
FIG. 5 is a diagram explaining the removing unit according to the first embodiment.

Reference will now be made in detail to the embodiments, examples of which are illustrated in the accompanying drawings, wherein like reference numerals refer to the like elements throughout. The embodiments are described below to explain the present invention by referring to the figures. In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element between the two elements, or one or more intervening elements may also be present.

In the process using the aforementioned conventional technique, the combinations of the characteristic point candidates are compared with the model, and the characteristic point candidates that form the combination that best matches the model are determined as the characteristic points. Thus, if a characteristic point candidate that corresponds to an authentic characteristic point is included in the combination of the characteristic point candidates, and another characteristic point candidate is located significantly far from an authentic characteristic point, there is a possibility that the combination may not best match the model.

For example, from an input image that is obtained by imaging a person's face in an environment in which high-intensity light is irradiated with the right half of the person's face, characteristic point candidates that correspond to characteristic points such as a right eye, a right naris and a right mouth corner, which are located in the right half of the person's face, may not be extracted in an excellent manner due to so-called overexposure of the image in some cases. In addition, characteristic points of the right eye, the right naris and the right mouth corner are not included in the input image in some cases, depending on the orientation of the face when the face is imaged. Even if other characteristic point candidates (such as a left eye and a left naris) that are included in a combination including the characteristic point candidates (corresponding to the right eye, the right naris and the right mouth corner) extracted in the aforementioned environment are authentic, there is a possibility that the degree of matching of the combination with the model may be reduced. Specifically, the authentic characteristic points may be hidden and may not be finally detected, depending on the state of the input image. As a result, in the process using the aforementioned technique, the accuracy of detecting characteristic points may be reduced.

The inventors propose an image processing program and an image processing device, which enable the accuracy of detecting characteristic points to be increased.

Embodiments of the image processing program disclosed herein and the image processing device disclosed herein are described in detail with reference to the accompanying drawings. The embodiments described below are embodiments, and do not limit the image processing program disclosed herein and the image processing device disclosed herein.

First Embodiment

Configuration of Image Processing Device (First Embodiment)

FIG. 1 is a functional block diagram illustrating a configuration of an image processing device according to a first embodiment. As illustrated in FIG. 1, the image processing device 200 according to the first embodiment is connected to an imaging device 100. The imaging device 100 images an object from which characteristic points are extracted, for example. For example, the imaging device 100 images an object such as a person's face, a vehicle or the like. In the embodiment described below, the imaging device 100 images a person's face as an object to be imaged as an example.

In addition, as illustrated in FIG. 1, the image processing device 200 includes an input unit 210, an output unit 220, a storage unit 230 and a controller 240.

The input unit 210 acquires an image obtained by the imaging device 100. The image that is acquired by the input unit 210 is stored in an image storage unit 231 of the storage unit 230. The output unit 220 outputs a result of a process performed by the controller 240 from the image processing device 200 to an external device. For example, the output unit 220 outputs the result of the process performed by the controller 240 to an external device that detects a line of sight and recognizes a facial expression.

The storage unit 230 includes the image storage unit 231 and a model storage unit 232 as illustrated in FIG. 1. Examples of the storage unit 230 are semiconductor elements such as a random access memory and a flash memory. The image storage unit 231 stores the image acquired by the input unit 210.

The model storage unit 232 stores dictionary information on a combination of a plurality of authentic characteristic points included in the person's face. An example of the dictionary information stored in the model storage unit 232 is described with reference to FIG. 2. FIG. 2 is a diagram explaining the model storage unit according to the first embodiment.

The model storage unit 232 stores characteristic points to be detected from an image obtained by imaging the person's face. For example, the model storage unit 232 stores information of distances between the characteristic points such as the pupils, the tip of the nose, the nares and the mouth corners. In the following description, the image that is obtained by imaging the person's face is called a face image in some cases. In addition, information of each of the distances between the characteristic points is called a link length in some cases. For example, the model storage unit 232 stores information of a distance between the pupils as a reference, and stores values obtained by normalizing distances between the other characteristic points. For example, as illustrated in FIG. 2, when the distance between the right pupil and the left pupil is "1.0", the model storage unit 232 stores a value of "0.6" as a distance between the right pupil or the left pupil and the tip of the nose.

In addition, the model storage unit 232 can combine pairs of the characteristic points prepared as the dictionary information and use various types or an arbitrary number of pairs that are among the pairs of the characteristic points on the basis of positional relationships among characteristic points to be detected. For each of the aforementioned distances between the characteristic points, the number of pixels between the characteristic points in the face image can be used. For example, the model storage unit 232 can calculate the number of pixels between characteristic points for each of multiple face images for learning, and treat the average of the calculated numbers of the pixels as the distance between the characteristic points. The model storage unit 232 may not use the distance between the pupils as the reference and store the values obtained by normalizing the distances between the other characteristic points. The model storage unit 232 may store the numbers of the pixels without the normalization.

Returning to FIG. 1, the controller 240 includes a face detecting unit 241, an extracting unit 242, a generating unit 243, a removing unit 244 and a determining unit 245. Examples of the controller 240 may be an electronic circuit and an integrated circuit. The electronic circuit may be a central processing unit (CPU), a micro processing unit (MPU) or the like, for example. The integrated circuit may be an application specific integrated circuit (ASIC), a field programmable gate array (FPGA) or the like, for example.

The face detecting unit 241 acquires the image from the image storage unit 231 and detects the face from the acquired image. For example, the face detecting unit 241 uses at least one of existing techniques such as an edge detection, pattern matching, an inter-frame difference and a neutral network and tries to detect the face from the image.

When the face detecting unit 241 detects the face from the image, the extracting unit 242 extracts, from the image, a plurality of characteristic point candidates that can be characteristic points such as the pupils, the tip of the nose, the nares and the mouth corners. For example, the extracting unit 242 performs a process using a separability filter or performs a process using pattern matching and thereby extracts the characteristic point candidates.

The generating unit 243 generates a plurality of combinations of the characteristic point candidates extracted by the extracting unit 242. For example, the generating unit 243 generates a plurality of exclusive combinations that each include a single characteristic point candidate for the right pupil, a single characteristic point candidate for the left pupil, a single characteristic point candidate for the tip of the nose, a single characteristic point candidate for the right naris, a single characteristic point candidate for the left naris, a single characteristic point candidate for the right mouth corner and a single characteristic point candidate for the left mouth corner.

The removing unit 244 removes, from each of the combinations generated by the generating unit 243, a characteristic point candidate that causes the largest deviation from the dictionary information among the characteristic point candidates included in the combination. The removing unit 244 is described below with reference to FIGS. 3 to 12. FIGS. 3 to 7 are diagrams explaining the removing unit according to the first embodiment.

Reference numeral 10 illustrated in FIG. 3 indicates a conceptual model that represents positional relationships among the characteristic points on the basis of the dictionary information. Symbols $E_1$ and $E_2$ illustrated in FIG. 3 indicate models of the pupils indicated in the dictionary information. A symbol $N_1$ illustrated in FIG. 3 indicates a model of the tip of the nose, while the tip of the nose is indicated in the dictionary information. Symbols $N_2$ and $N_3$ illustrated in FIG. 3 indicate models of the nares indicated in the dictionary information. Symbols $M_1$ and $M_2$ illustrated in FIG. 3 indicate models of the mouth corners indicated in the dictionary information. Reference numeral 20 illustrated in FIGS. 3 to 7 indicates a conceptual model that represents positional relationships among characteristic point candidates included in a combination generated by the generating unit 243 or represents the positional relationships among the characteristic point candidates on the image acquired from the image storage unit 231. Symbols $E_1'$ and $E_2'$ illustrated in FIG. 3 indicate models of candidates that are candidates for the pupils and included in the combination. A symbol $N_1'$ illustrated in FIG. 3 indicates a model of a candidate that is a candidate for the tip of the nose and included in the combination. Symbols $N_2'$ and $N_3'$ illustrated in FIG. 3 indicate models of candidates that are candidates for the nares and included in the combination. Symbols $M_1'$ and $M_2'$ illustrated in FIG. 3 indicate models of candidates that are candidates for the mouth corners and included in the combination.

First, the removing unit 244 acquires a single combination from the plurality of combinations generated by the generating unit 243. Then, the removing unit 244 acquires the dictionary information from the model storage unit 232 and calculates deviations of the distances (link lengths) between the characteristic point candidates included in the combination generated by the generating unit 243 from the distances (link lengths) between the characteristic points included in the dictionary information. Conceptually speaking, the removing unit 244 compares the conceptual model 10 based on the dictionary information with the conceptual model 20 of the combination generated by the generating unit 243 as illustrated in FIG. 3, and calculates the deviations of the conceptual model 20 from the conceptual model 10.

Next, the removing unit 244 specifies a link that causes the maximum deviation among the deviations of the distances (link lengths) between the characteristic point candidates included in the combination generated by the generating unit 243 from the distances (link lengths) between the characteristic points included in the dictionary information. Then, the removing unit 244 detects a characteristic point candidate that is among a plurality of characteristic point candidates connected to the specified link causing the maximum deviation from the dictionary information and causes a larger deviation than the other characteristic point candidate connected to the specified link. The removing unit 244 removes the detected characteristic point candidate from the combination of the characteristic point candidates.

For example, it is assumed that the removing unit 244 specifies, as the link causing the maximum deviation of the link length, a link that connects the model $N_1'$ of the candidate for the tip of the nose to the model $N_2'$ of the candidate for the right naris. In this assumption, the removing unit 244 detects a characteristic point candidate that is among the model $N_1'$ of the candidate for the tip of the nose and the model $N_2'$ of the candidate for the right naris and causes a larger deviation than the other characteristic point candidate. As illustrated by dotted lines of FIG. 4, the removing unit 244 calculates the sum of deviations of link lengths of links connected to the model $N_1'$ of the candidate for the tip of the nose. Similarly, as illustrated by dotted lines of FIG. 5, the removing unit 244 calculates the sum of deviations of link lengths of links connected to the model $N_2'$ of the candidate for the right naris. Then, the removing unit 244 compares the calculated sum of the deviations relating to the model $N_1'$ of the candidate for the tip of the nose with the calculated sum of the deviations relating to the model $N_2'$ of the candidate for the right naris, and detects, as the characteristic point candidate causing the larger deviation than the other characteristic point candidate, a model that is among the models $N_1'$ and $N_2'$ and corresponds to the larger calculated sum.

Figure 6:
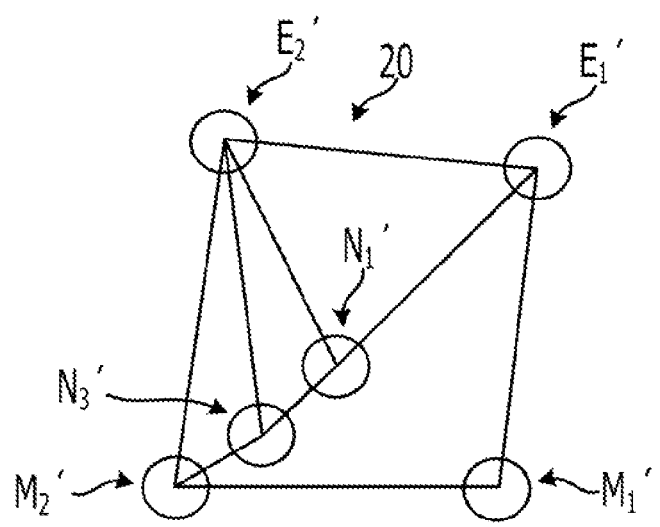
FIG. 6 is a diagram explaining the removing unit according to the first embodiment.
Figure 7:
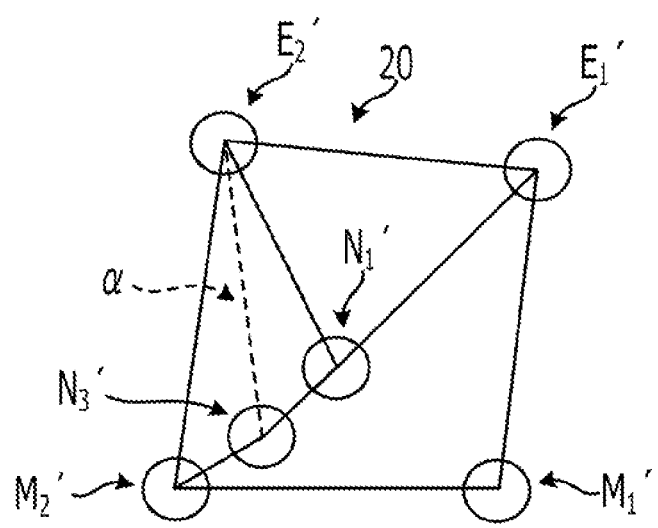
FIG. 7 is a diagram explaining the removing unit according to the first embodiment.

If the removing unit 244 detects, as the characteristic point candidate causing the larger deviation than the other characteristic point candidate, the model $N_2'$ (illustrated in FIG. 5) of the candidate for the right naris as a result of the aforementioned process, the removing unit 244 removes the model $N_2'$ of the candidate for the right naris from the selected combination. Conceptually speaking, as illustrated in FIG. 6, the conceptual model 20 is in a state after the removing unit 244 removes the model $N_2'$ of the candidate for the right naris from the conceptual model 20 selected from among the combinations generated by the generating unit 243, for example.

Subsequently, the removing unit 244 recalculates the deviations of the distances (link lengths) between the characteristic point candidates remaining after the removal of the model $N_2'$ of the candidate for the right naris from the distances (link lengths) between the characteristic points indicated in the dictionary information. Conceptually speaking, the removing unit 244 compares the conceptual model 10 based on the dictionary information with the conceptual model 20 configured with the characteristic point candidates remaining after the removal of the model $N_2'$ of the candidate for the right naris, and calculates the deviations of the conceptual model 20 from the conceptual model 10.

Then, the removing unit 244 acquires the maximum value among the deviations of the distances between the characteristic point candidates remaining after the removal of the model $N_2'$ of the candidate for the right naris from the distances between the characteristic points indicated in the dictionary information. The removing unit 244 associates the acquired maximum value with the combination of the characteristic point candidates remaining after the removal of the model $N_2'$ of the candidate for the right naris, and stores the acquired maximum value and the combination of the characteristic point candidates remaining after the removal of the model $N_2'$ of the candidate for the right naris. For example, when a deviation of the link length of a link a (illustrated in FIG. 7) that connects the characteristic point candidates to each other is the maximum value among deviations of the characteristic point candidates included in the combination illustrated in FIG. 6, the removing unit 244 associates the maximum value with the combination of the characteristic point candidates illustrated in FIG. 7, and stores the maximum value and the combination of the characteristic point candidates illustrated in FIG. 7. Specifically, the removing unit 244 associates the deviation of the link length with the positions of the characteristic point candidates (illustrated in FIG. 7) on the image, and stores the deviation of the link length and the positions of the characteristic point candidates (illustrated in FIG. 7) on the image.

Then, the removing unit 244 determines whether or not the removing unit 244 has completed the aforementioned process on all the combinations generated by the generating unit 243. When the aforementioned process has yet to be performed on at least one of the combinations generated by the generating unit 243, the removing unit 244 selects the next combination and performs the aforementioned process on the selected combination. On the other hand, when the removing unit 244 has completed the aforementioned process on all the combinations generated by the generating unit 243, the removing unit 244 activates a process to be performed by the determining unit 245 (described later).

When the process has been completed by the removing unit 244, the determining unit 245 searches the minimum value among the maximum values that are among the deviations and have been stored by the removing unit 244. Then, the determining unit 245 acquires a combination associated with the searched minimum value, and determines, as final characteristic points, characteristic point candidates included in the acquired combination.

Process to be Performed by Imaging Processing Device (First Embodiment)

Figure 8:
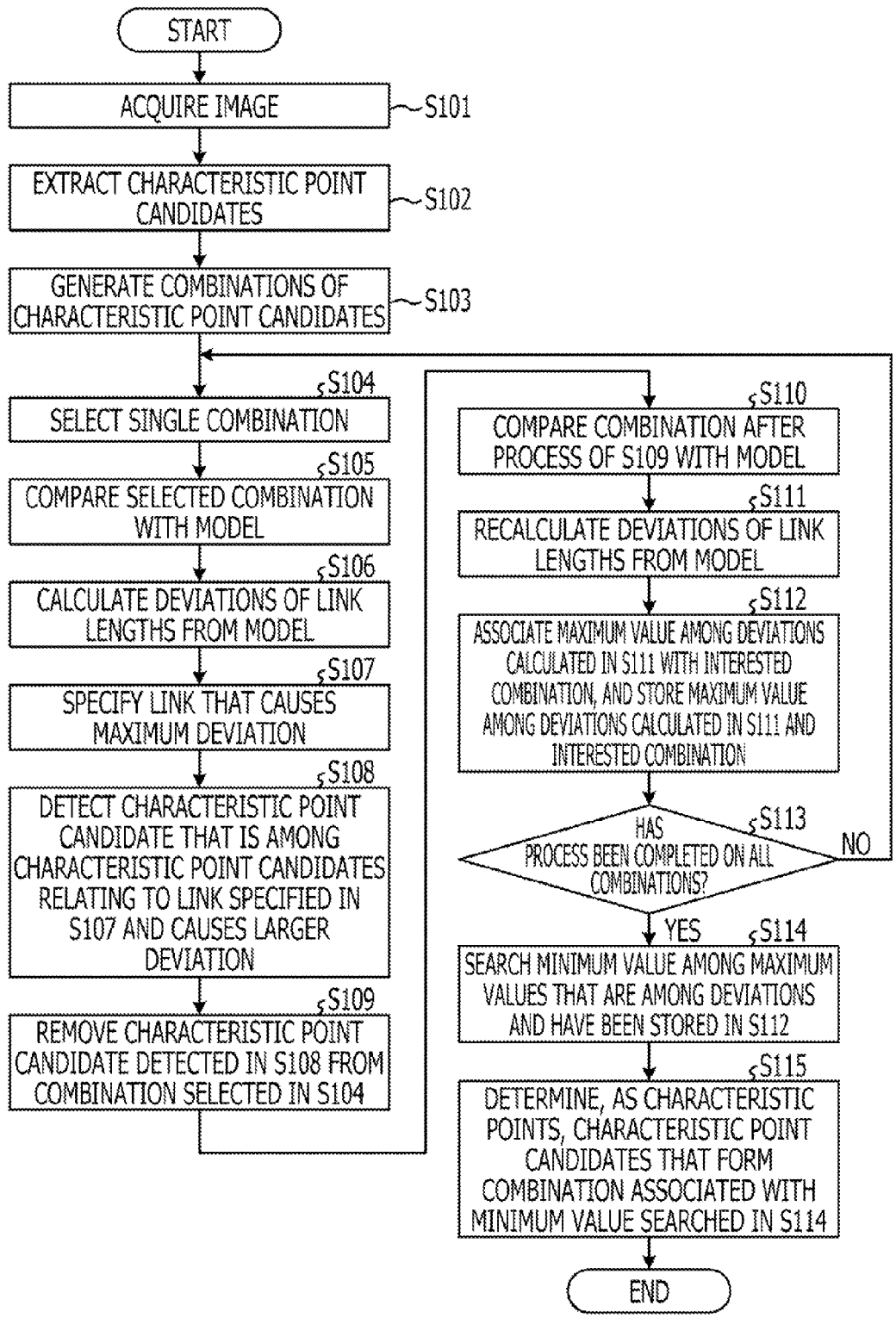
FIG. 8 is a diagram illustrating the overall flow of a process that is performed by the image processing device according to the first embodiment.

The flow of a process that is performed by the image processing device 200 according to the first embodiment is described with reference to FIG. 8. FIG. 8 is a diagram illustrating the overall flow of the process that is performed by the image processing device according to the first embodiment. The process illustrated in FIG. 8 is activated at a time set in the image processing device 200 or at the time when the image processing device 200 acquires an image obtained by the imaging device 100. In the following description, a "model" indicates distances (link lengths) between the characteristic points that are stored as the dictionary information in the model storage unit 232.

As illustrated in FIG. 8, the face detecting unit 241 acquires the image from the image storage unit 231 (in operation S101). When the face detecting unit 241 detects the face from the image, the face detecting unit 241 activates the process to be performed by the extracting unit 242. The extracting unit 242 extracts, from the image, a plurality of characteristic point candidates that can be the characteristic points such as the pupils, the tip of the nose, the nares, and the mouth corners (in operation S102). Subsequently, the generating unit 243 generates a plurality of combinations of the characteristic point candidates extracted by the extracting unit 242 (in operation S103).

Next, the removing unit 244 selects a single combination from among the combinations generated in operation S103 (in operation S104), and compares the selected combination with the model (in operation S105). Then, the removing unit 244 calculates deviations of link lengths of the combination from the model, or calculates the deviations of the link lengths between characteristic point candidates included in the combination selected in operation S104 from the model (in operation S106).

Next, the removing unit 244 specifies a link that causes the maximum deviation among the results of the process of operation S106 (in operation S107). Subsequently, the removing unit 244 detects a characteristic point candidate that is among characteristic point candidates relating to the link specified in operation S107 and causes a larger deviation than the other characteristic point candidate relating to the link specified in operation S107 (in operation S108). Then, the removing unit 244 removes the characteristic point candidate detected in operation S108 from the combination selected in operation S104 (in operation S109).

Next, the removing unit 244 compares the combination after the process of operation S109 with the model in substantially the same manner as the aforementioned operation S105 (in operation S110). Subsequently, the removing unit 244 recalculates the deviations of the link lengths from the model in substantially the same manner as the aforementioned operation S106 (in operation S111). Then, the removing unit 244 associates the maximum value among the deviations calculated in operation S111 with the interested combination that is currently processed, and the removing unit 244 stores the maximum value among the deviations calculated in operation S111 and the interested combination that is currently processed (in operation S112). The removing unit 244 determines whether or not the removing unit 244 has completed the process on all the combinations generated in operation S103 (in operation S113).

When the process has yet to be processed on at least one of all the combinations as a result of the determination (No in operation S113), the removing unit 244 causes the process illustrated in FIG. 8 to return to the aforementioned process of operation S104 and acquires the next combination. When the process has been completed on all the combinations (Yes in operation S113), the removing unit 244 activates the process to be performed by the determining unit 245. The determining unit 245 searches the minimum value among the maximum values that are among the deviations and have been stored in operation S112 (in operation S114). Then, the determining unit 245 acquires a combination associated with the minimum value searched in operation S114, and determines, as the final characteristic points, characteristic point candidates included in the acquired combination (in operation S115). Then, determining unit 245 terminates the process.

Effects Obtained in First Embodiment

As described above, the image processing device 200 performs matching of the model with a combination from which a characteristic point candidate that is likely to cause a deviation has been removed. The image processing device 200 determines, as the final characteristic points, a plurality of characteristic point candidates included in the selected combination on the basis of the matching results. Thus, according to the first embodiment, the accuracy of detecting characteristic points can be improved.

In addition, the image processing device 200 removes, from the combination, the characteristic point candidate that is likely to cause the deviation, and the image processing device 200 compares the model with the combination from which the characteristic point candidate that is likely to cause the deviation has been removed. Thus, before the image processing device 200 compares the combination with the model, the image processing device 200 can remove an effect of the characteristic point candidate that is likely to cause the deviation. Thus, according to the first embodiment, the accuracy of detecting characteristic points can be improved.

Second Embodiment

The first embodiment describes that the deviations of the combinations of the characteristic point candidates from the model of the dictionary information stored in the model storage unit 232 are calculated, and that a characteristic point candidate that is likely to cause a deviation is removed on the basis of the calculated deviations. However, the technique disclosed herein is not limited to this. For example, a characteristic point candidate that is likely to cause a deviation can be removed on the basis of likelihoods that indicate likelihoods of the characteristic point candidates for the characteristic points.

Process to be Performed by Image Processing Device (Second Embodiment)

Figure 9:
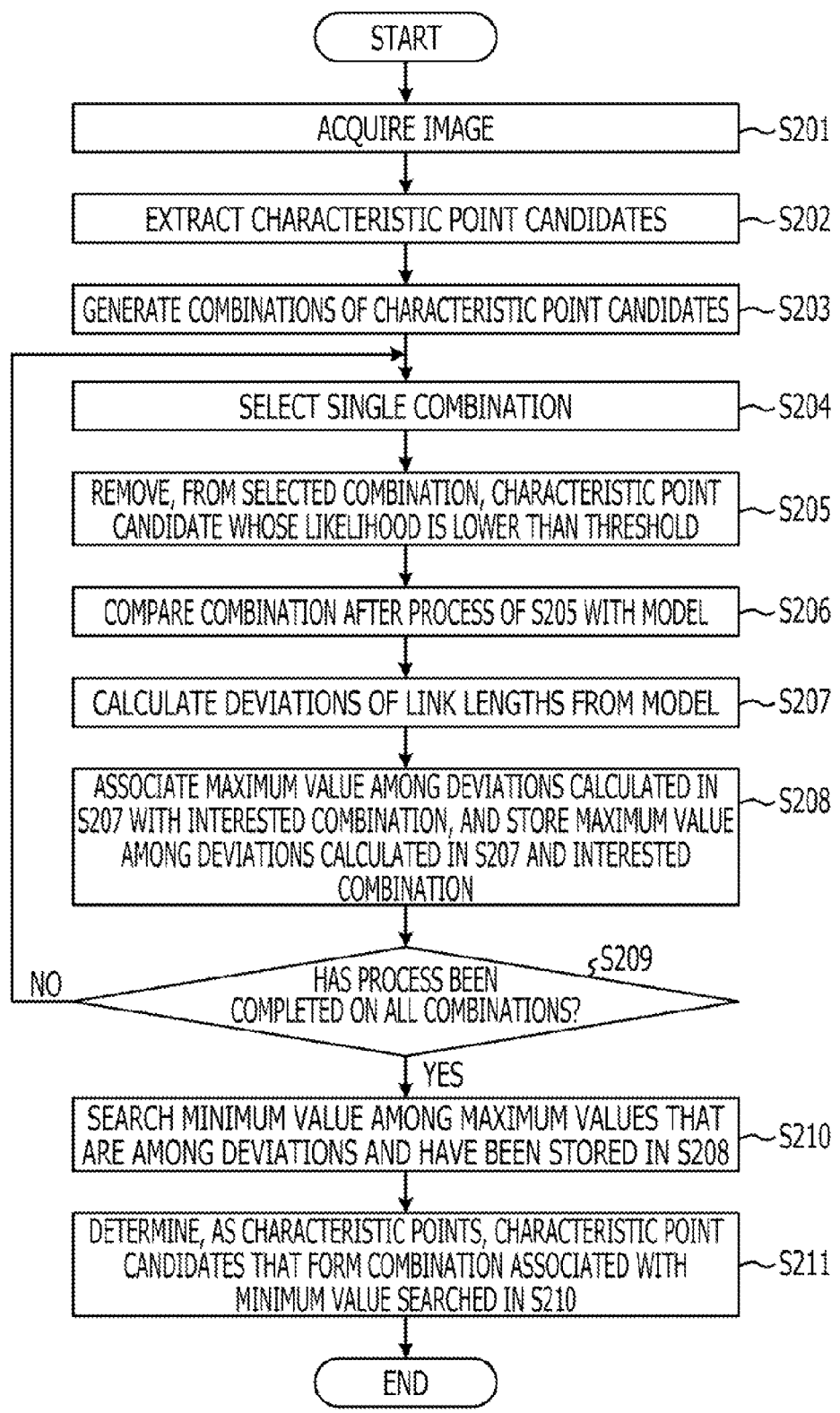
FIG. 9 is a diagram illustrating the flow of a process that is performed by the image processing device according to a second embodiment.
Figure 10:
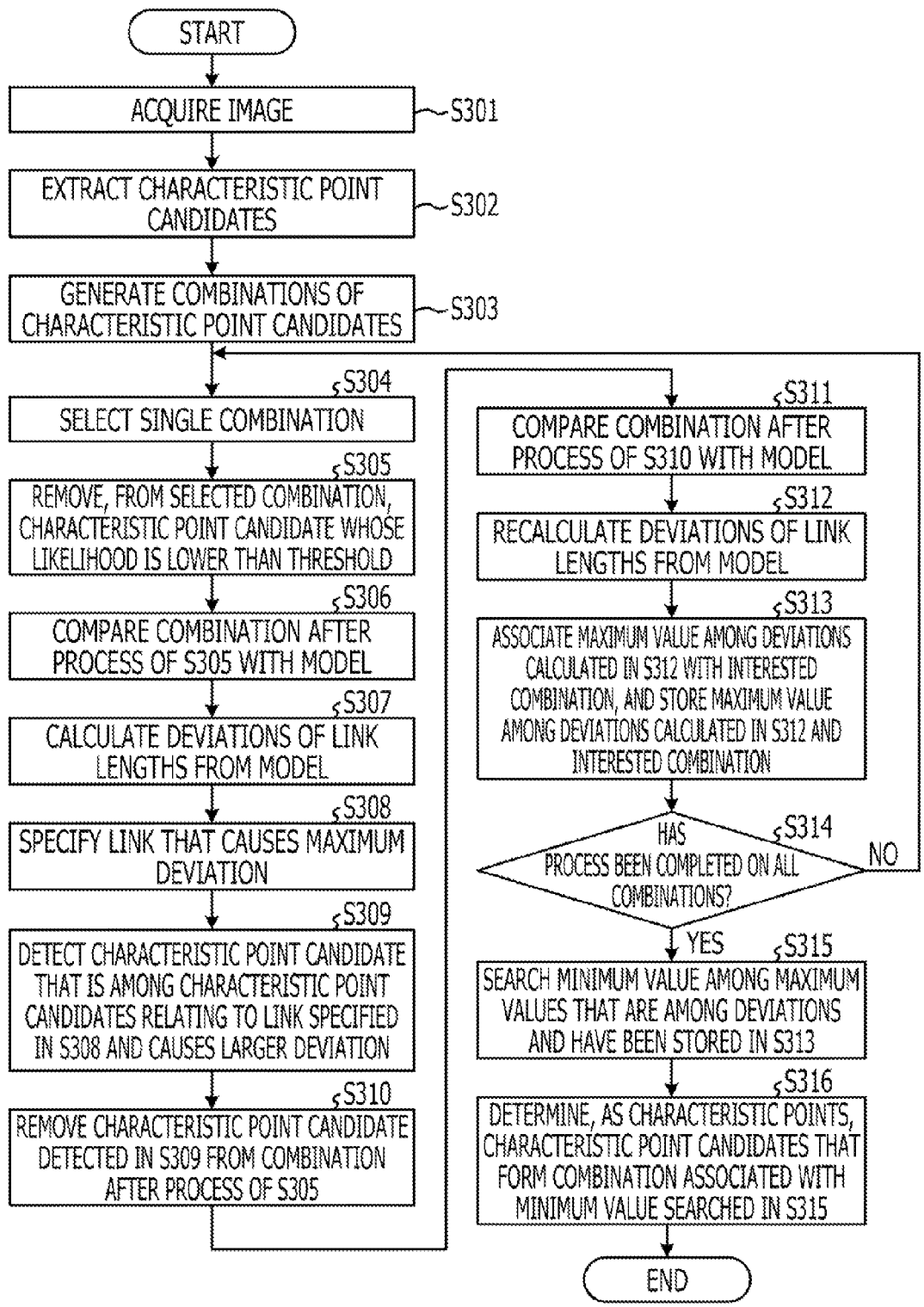
FIG. 10 is a diagram illustrating the flow of a process that is performed by the image processing device according to the second embodiment.

The image processing device according to a second embodiment has the same constituent blocks as the image processing device according to the first embodiment, or has substantially the same constituent blocks as the image processing device 200 illustrated in FIG. 1. The flows of processes that are performed by the image processing device according to the second embodiment are described with reference to FIGS. 9 and 10. FIGS. 9 and 10 are diagrams illustrating the flows of the processes that are performed by the image processing device according to the second embodiment.

As illustrated in FIG. 9, the face detecting unit 241 acquires the image from the image storage unit 231 (in operation S201). When the face detecting unit 241 detects the face from the image, the face detecting unit 241 activates the process to be performed by the extracting unit 242. The extracting unit 242 extracts, from the image, a plurality of characteristic point candidates that can be the characteristic points such as the pupils, the tip of the nose, the nares, and the mouth corners (in operation S202). Subsequently, the generating unit 243 generates a plurality of combinations of the characteristic point candidates extracted by the extracting unit 242 (in operation S203). In other words, processes in operation S201 to S203 are substantially the same as the processes in operation S101 to S103 of the first embodiment.

The processes that are performed by the image processing device according to the second embodiment are different in the following features from the process that is performed by the image processing device according to the first embodiment. Specifically, as illustrated in FIG. 9, the removing unit 244 selects a single combination from among combinations generated in operation S203 (in operation S204) and removes, from the selected combination, a characteristic point candidate whose likelihood is lower than a threshold (in operation S205).

Next, the removing unit 244 compares the combination after the process of operation S205 with the model (in operation S206). Subsequently, the removing unit 244 calculates deviations of link lengths of the combination from the model, or calculates the deviations of the link lengths between characteristic point candidates included in the combination after the process of operation S205 from the model (in operation S207). Then, the removing unit 244 associates the maximum value among the deviations calculated in operation S207 with the interested combination that is currently processed, and the removing unit 244 stores the maximum value among the deviations calculated in operation S207 and the interested combination that is currently processed (in operation S208). Processes in operation S209 to S211 are substantially the same as the processes in operation S113 to S115 of the first embodiment.

Specifically, the removing unit 244 determines whether or not the removing unit 244 has completed the process on all the combinations generated in operation S203 (in operation S209). When the process has yet to be performed on at least one of all the combinations as a result of the determination (No in operation S209), the removing unit 244 causes the process illustrated in FIG. 9 to return to the aforementioned process of operation S204 and acquires the next combination. On the other hand, when the process has been completed on all the combinations (Yes in operation S209), the removing unit 244 activates the process to be performed by the determining unit 245. The determining unit 245 searches the minimum value among the maximum values that are among the deviations and have been stored in operation S208 (in operation S210). Then, the determining unit 245 acquires a combination associated with the minimum value searched in operation S210, and determines, as the final characteristic points, characteristic point candidates included in the acquired combination (in operation S211). Then, the determining unit 245 terminates the process.

The extracting unit 242 can use, as the likelihoods used in the process of the aforementioned operation S205, response values that are provided from the separability filter in order to extract the characteristic point candidates such as the pupils and the nares from the image.

As illustrated in FIG. 10, both removal of a characteristic point candidate on the basis of the deviations of the selected combination from the model described in the first embodiment and removal of a characteristic point candidate on the basis of the likelihoods can be performed.

As illustrated in FIG. 10, the face detecting unit 241 acquires the image from the image storage unit 231 (in operation S301). When the face detecting unit 241 detects the face from the image, the face detecting unit 241 activates the process to be performed by the extracting unit 242. The extracting unit 242 extracts, from the image, a plurality of characteristic point candidates that can be the characteristic points such as the pupils, the tip of the nose, the nares, and the mouth corners (in operation S302). Subsequently, the generating unit 243 generates a plurality of combinations of the characteristic point candidates extracted by the extracting unit 242 (in operation S303). In other words, processes in operation S301 to S303 are substantially the same as the processes in operation S101 to S103 of the first embodiment.

Next, the removing unit 244 selects a single combination from among combinations generated in operation S303 (in operation S304) and removes, from the selected combination, a characteristic point candidate whose likelihood is lower than the threshold (in operation S305).

Next, the removing unit 244 compares the combination after the process of operation S305 with the model (in operation S306). Subsequently, the removing unit 244 calculates deviations of link lengths of the combinations from the model, or calculates the deviations of the link lengths between characteristic point candidates included in the combination after the process of operation S305 from the model (in operation S307).

Next, the removing unit 244 specifies a link that causes the maximum deviation among the results of the process of operation S307 (in operation S308). Subsequently, the removing unit 244 detects a characteristic point candidate that is among characteristic point candidates relating to the link specified in operation S308 and causes a larger deviation than the other characteristic point candidate relating to the link specified in operation S308 (in operation S309). Then, the removing unit 244 removes the characteristic point candidate detected in operation S309 from the combination after the process of operation S305 (in operation S310).

Next, the removing unit 244 compares the combination after the process of operation S310 with the model in substantially the same manner as the aforementioned operation S306 (in operation S311). Subsequently, the removing unit 244 recalculates the deviations of the link lengths from the model in substantially the same manner as the aforementioned operation S307 (in operation S312). Then, the removing unit 244 associates the maximum value among the deviations calculated in operation S312 with the interested combination that is currently processed, and the removing unit 244 stores the maximum value among the deviations calculated in operation S312 and the interested combination that is currently processed (in operation S313). Processes other than the aforementioned processes are substantially the same as the processes illustrated in FIG. 8 in the first embodiment and the processes illustrated in FIG. 9.

Specifically, the removing unit 244 determines whether or not the removing unit 244 has completed the process on all the combinations generated in operation S303 (in operation S314). When the process has yet to be performed on at least one of all the combinations as a result of the determination (No in operation S314), the removing unit 244 causes the process illustrated in FIG. 10 to return to the aforementioned process of operation S304 and acquires the next combination. On the other hand, when the process has been completed on all the combinations (Yes in operation S314), the removing unit activates the process to be performed by the determining unit 245. The determining unit 245 searches the minimum value among the maximum values that are the deviations and have been stored in operation S313 (in operation S315). Then, the determining unit 245 acquires a combination associated with the minimum value searched in operation S315, and determines, as the final characteristic points, characteristic point candidates included in the acquired combination (in operation S316). Then, the determining unit 245 terminates the process.

Effects Obtained in Second Embodiment

As described above, in the second embodiment, a characteristic point candidate that is likely to cause a deviation is removed on the basis of the likelihoods that indicate the likelihoods of the characteristic point candidates for the characteristic points. Thus, according to the second embodiment, an effect of the characteristic point candidate that is likely to cause the deviation can be removed by the simple process, and the accuracy of detecting characteristic points can be improved.

In the second embodiment, both removal of a characteristic point candidate on the basis of the deviations of the link lengths from the model and removal of a characteristic point candidate on the basis of the likelihoods are performed. Thus, according to the second embodiment, effects of characteristic point candidates that are likely to cause deviations can be removed on the basis of the various indexes, and the accuracy of detecting characteristic points can be improved.

The second embodiment describes that the characteristic point candidate that is likely to cause the deviation is removed on the basis of the likelihoods of the characteristic point candidates for the characteristic points. The second embodiment is not limited to this.

For example, the removing unit 244 may acquire, from an image analyzing unit 246, information of the position of a characteristic point candidate removed by a previous process. Then, the removing unit 244 may remove, from a combination of characteristic point candidates, a characteristic point candidate that corresponds to the characteristic point candidate removed by the previous process on the basis of the acquired information of the position of the characteristic point candidate. In this manner, the characteristic point candidate that is likely to cause a deviation and corresponds to the characteristic point candidate removed by the previous process may be removed from the combination of the characteristic point candidates in the second embodiment. In addition, in the second embodiment, both removal of a characteristic point candidate from the combination of the characteristic point candidates on the basis of deviations of link lengths from the model and removal of a characteristic point candidate from the combination of the characteristic point candidates on the basis of the result of the previous process may be performed.

In this case, it is possible to effectively use the result of the previous process and remove, in advance, an effect of the characteristic point candidate that is likely to cause the deviation.

In addition, the second embodiment describes that a characteristic point candidate is removed on the basis of the likelihoods of the characteristic point candidates. However, the following process may be performed. For example, deviations of the link lengths of links connecting characteristic point candidates to each other from the model are corrected on the basis of the likelihoods of the characteristic point candidates that form the links. For example, the deviations are corrected so that as the likelihoods of the characteristic point candidates that form each of the links are larger, the deviation of the link length of the link from the model is smaller. Then, similarly to the first embodiment, a link that causes the maximum deviation of the link length of the link from the model is specified, and a characteristic point candidate that is among characteristic point candidates relating to the specified link and causes a larger deviation than the other characteristic point candidate relating to the specified link is removed from a combination of the characteristic point candidates, for example. In this process, an effect of a characteristic point candidate that is likely to cause a deviation can be removed in advance, and the accuracy of detecting characteristic points can be improved.

Third Embodiment

In the second embodiment, the likelihoods of the characteristic point candidates may be adjusted on the basis of a facial orientation that is acquired from information obtained by analyzing the image, and a characteristic point candidate may be removed on the basis of the adjusted likelihoods.

Figure 11:
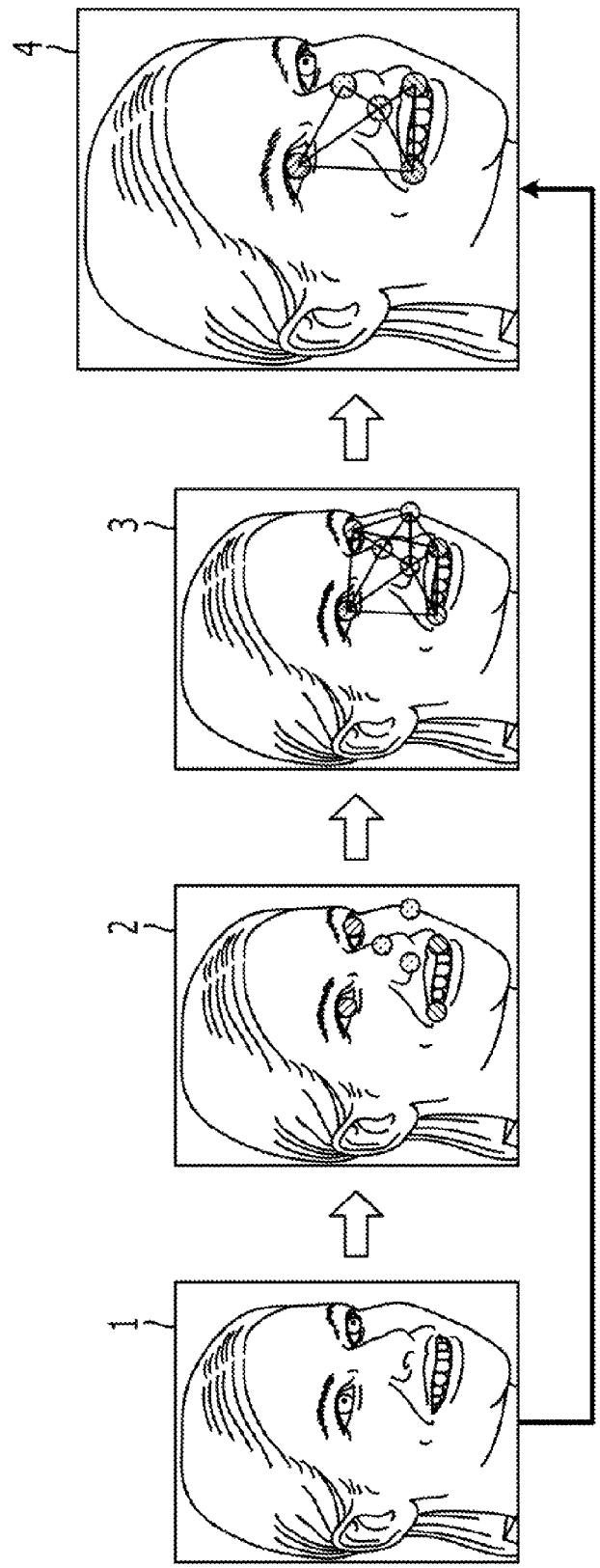
FIG. 11 is a diagram explaining the image processing device according to a third embodiment.

FIG. 11 is a diagram explaining the image process device according to a third embodiment. The image processing device according to the third embodiment receives an image as indicated by reference numeral 1 illustrated in FIG. 11. Next, the image processing device according to the third embodiment extracts, from the received image, a plurality of characteristic point candidates represented by circles as indicated by reference numeral 2 illustrated in FIG. 11. Subsequently, the image processing device according to the third embodiment generates a combination of the characteristic point candidates as indicated by reference numeral 3 illustrated in FIG. 11. In this case, the image processing device according to the third embodiment analyzes the received image, acquires a facial orientation from the analyzed image, and adjusts likelihoods of the characteristic point candidates on the basis of the facial orientation. Then, the image processing device according to the third embodiment removes a characteristic point candidate on the basis of the adjusted likelihoods as indicated by reference numeral 4 illustrated in FIG. 11.

Configuration of Image Processing Device (Third Embodiment)

Figure 12:
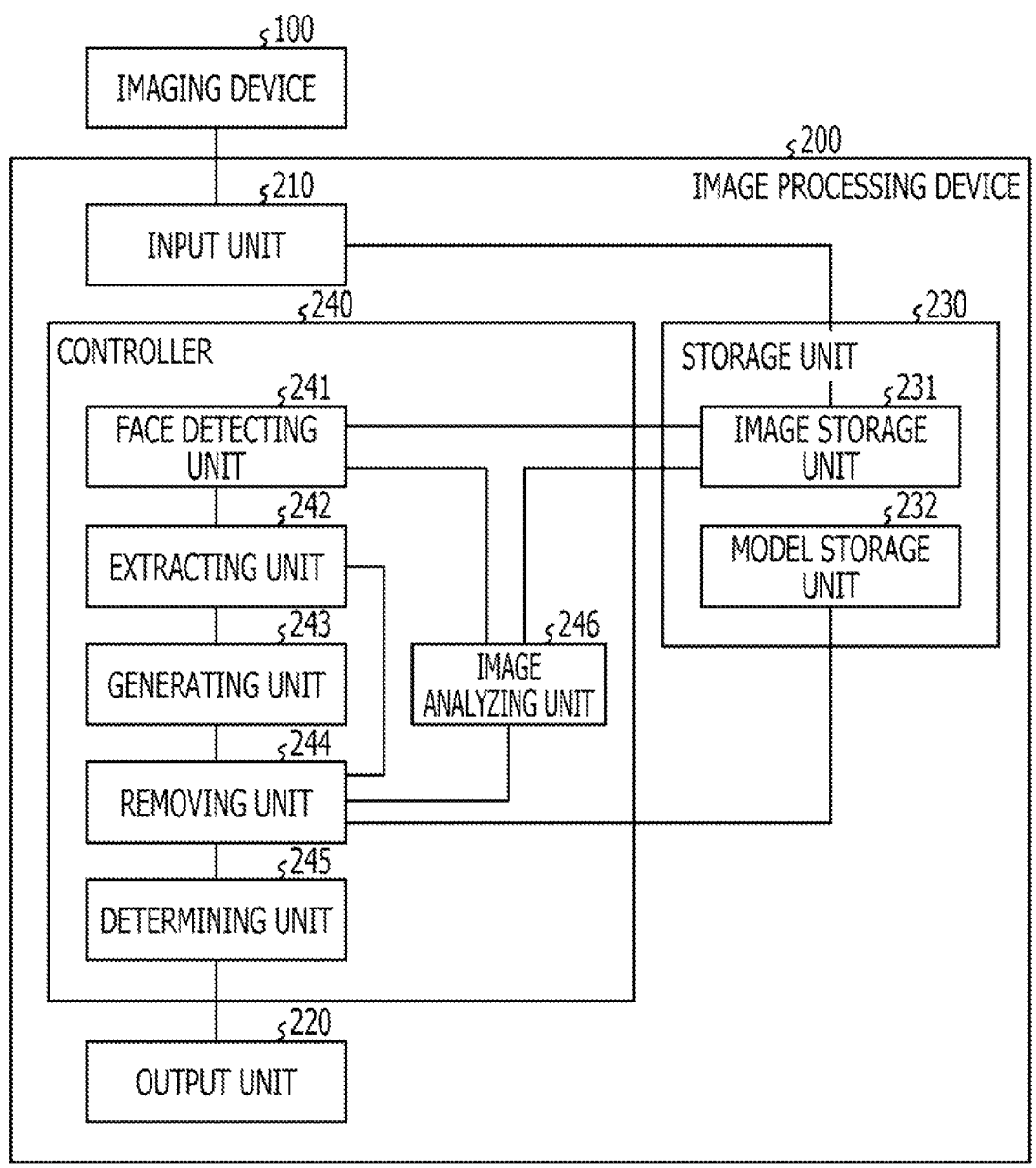
FIG. 12 is a functional block diagram illustrating a configuration of the image processing device according to the third embodiment.

FIG. 12 is a functional block diagram illustrating a configuration of the image processing device according to the third embodiment. The image processing device according to the third embodiment basically has substantially the same configuration as the image processing device according to the first embodiment, but is different in the following features from the image processing device according to the first embodiment.

When the face detecting unit 241 detects the face from the image, the image analyzing unit 246 acquires, from the image storage units 231, a plurality of input frames of the image, and acquires information of the facial orientation by analyzing the acquired frames. In this case, the plurality of input frames are a current input frame and a previous input frame. For example, the image analyzing unit 246 extracts and acquires the outlines of the eyes from the previous frame, and calculates a horizontal distance between the outer corners of the eyes. Then, the image analyzing unit 246 acquires information of the facial orientation by tracking a change in horizontal distance between the outer corners of the eyes over time from the previous input frame to the current input frame.

The removing unit 244 adjusts, on the basis of the information that indicates the facial orientation and has been acquired by the image analyzing unit 246, the likelihoods of the characteristic point candidates included in each of the combinations generated by the generating unit 243. For example, when the removing unit 244 acquires, from the image analyzing unit 246, information that indicates that the face is oriented toward the right side as illustrated in FIG. 11, the removing unit 244 adjusts the likelihoods of the right pupil, the right naris and the right mouth corner, which are among the characteristic point candidates and located on the right side of the face, so that the likelihoods of the right pupil, the right naris and the right mouth corner are reduced at a rate set in advance. After the adjustment of the likelihoods, the removing unit 244 removes, from the characteristic point candidates included in the combination, a characteristic point candidate whose likelihood is lower than the threshold.

In addition, the image analyzing unit 246 acquires, from the removing unit 244, information of a characteristic point candidate that has been removed by the previous process from the previous input frame on the basis of the likelihoods. Then, the image analyzing unit 246 performs matching of the current input frame with the previous input frame, and acquires information of the position of the characteristic point candidate that has been removed by the previous process from the previous input frame.

The removing unit 244 acquires, from the image analyzing unit 246, the information of the position of the characteristic point candidate removed by previous process. Then, the removing unit 244 removes, from the characteristic point candidates included in the combination on the basis of the position of the characteristic point candidate removed by the previous process, a characteristic point candidate that corresponds to the characteristic point candidate removed by previous process.

Process to be Performed by Image Processing Device (Third Embodiment)

Figure 13:
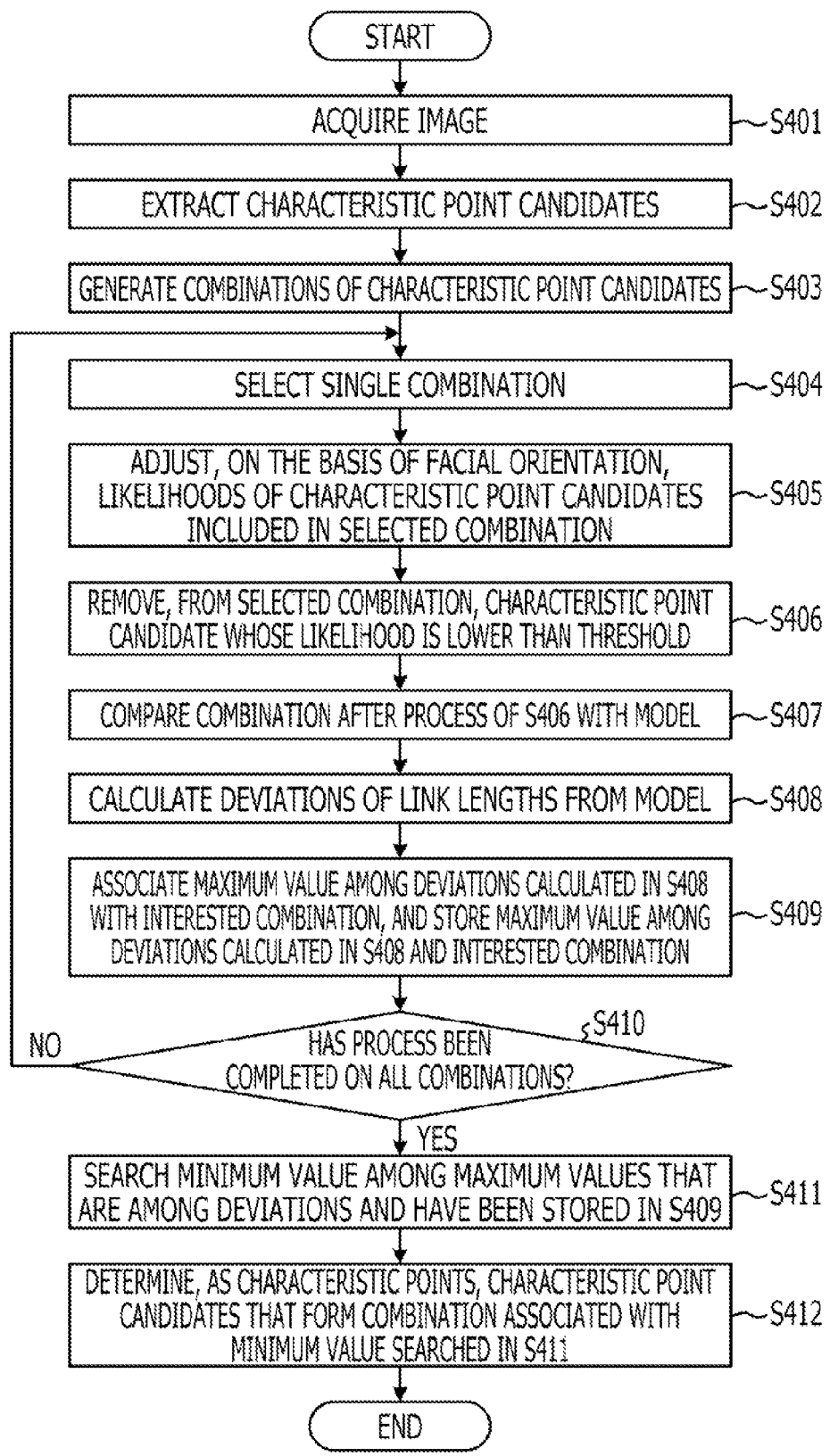
FIG. 13 is a diagram illustrating the flow of a process that is performed by the image processing device according to the third embodiment.
Figure 14:
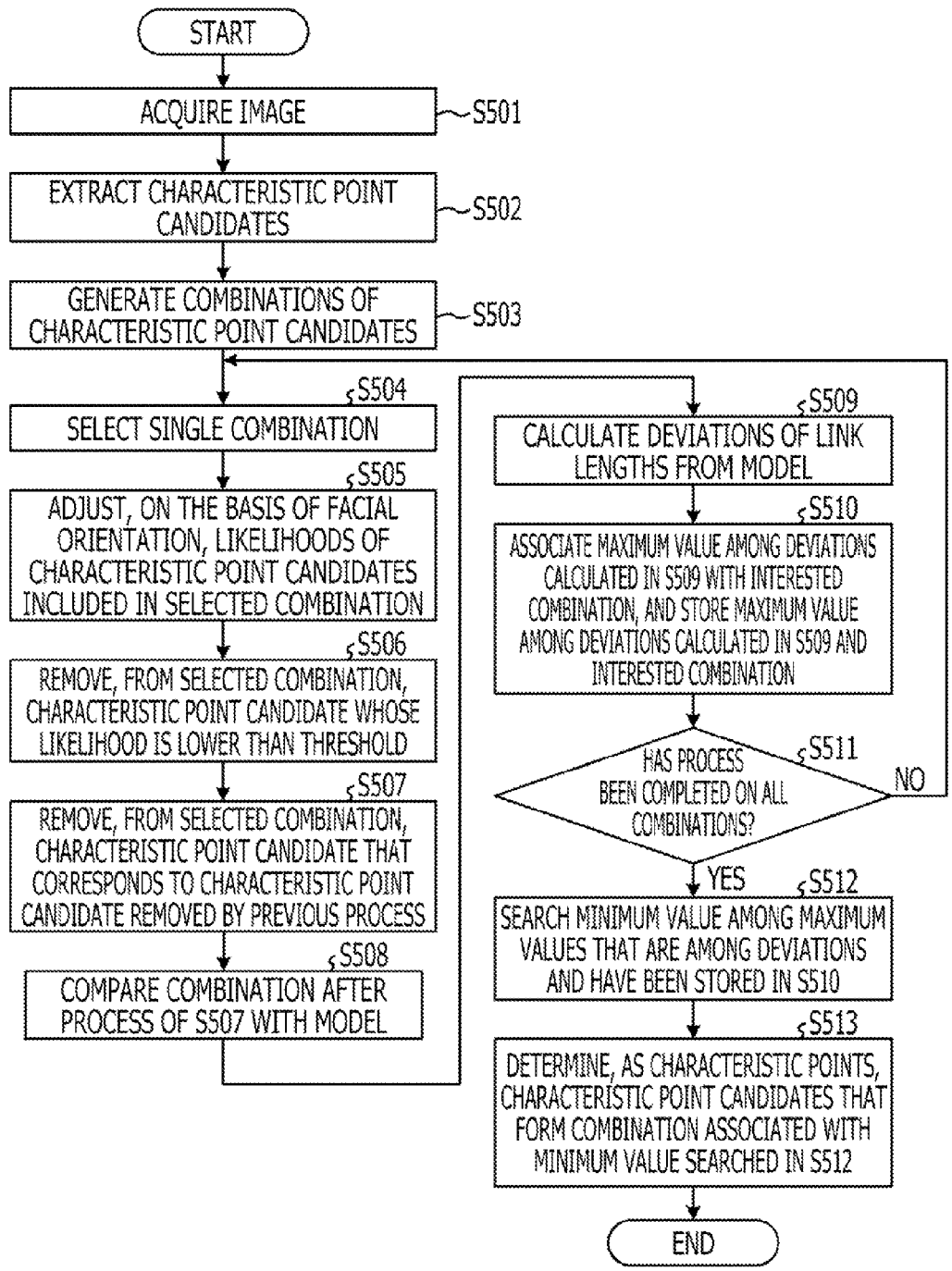
FIG. 14 is a diagram illustrating the flow of a process that is performed by the image processing device according to the third embodiment.

The flows of processes that are performed by the image processing device according to the third embodiment are described with reference to FIGS. 13 and 14. FIGS. 13 and 14 are diagrams illustrating the flows of the processes that are performed by the image processing device according to the third embodiment.

First, the flow of the process, in which likelihoods are adjusted and a characteristic point candidate is removed on the basis of the adjusted likelihoods, is described with reference to FIG. 13. As illustrated in FIG. 13, the face detecting unit 241 acquires the image from the image storage unit 231 (in operation S401). When the face detecting unit 241 detects the face from the image, the face detecting unit 241 activates the process to be performed by the extracting unit 242. The extracting unit 242 extracts, from the image, a plurality of characteristic point candidates that can be the characteristic points such as the pupils, the tip of the nose, the nares, and the mouth corners (in operation S402). Subsequently, the generating unit 243 generates a plurality of combinations of the characteristic point candidates extracted by the extracting unit 242 (in operation S403). In other words, processes in operation S401 to S403 are substantially the same as the processes in operation S301 to S303 of the second embodiment.

The process that is performed by the image processing device according to the third embodiment is different in the following features from the process that is performed by the image processing device according to the second embodiment. Specifically, as illustrated in FIG. 13, the removing unit 244 selects a single combination from among combinations generated in operation S403 (in operation S404), and adjusts likelihoods of characteristic point candidates included in the selected combination on the basis of the facial orientation (in operation S405). After the process of operation S405, the removing unit 244 removes, from the combination selected in operation S404, a characteristic point candidate whose likelihood is lower than the threshold (in operation S406). Processes other than the aforementioned processes are substantially the same as the second embodiment.

Specifically, the removing unit 244 compares the combination after the process of operation S406 with the model (in operation S407). Then, the removing unit 244 calculates deviations of link lengths of the combination from the model, or calculates the deviations of the link lengths between the characteristic point candidates included in the combination after the process of operation S406 from the model (in operation S408). Subsequently, the removing unit 244 associates the maximum value among the deviations calculated in operation S408 with the interested combination that is currently processed, and the removing unit 244 stores the maximum value among the deviations calculated in operation S408 and the interested combination that is currently processed (in operation S409). Then, the removing unit 244 determines whether or not the removing unit 244 has completed the process on all the combinations generated in operation S403 (in operation S410). When the process has yet to be performed on at least one of all the combinations as a result of the determination (No in operation S410), the removing unit 244 causes the process illustrated in FIG. 13 to return to the aforementioned process of operation S404 and acquires the next combination. On the other hand, when the process has been completed on all the combinations (Yes in operation S410), the removing unit 244 activates the process to be performed by the determining unit 245. The determining unit 245 searches the minimum value among the maximum values that are among the deviations and have been stored in operation S409 (in operation S411). Then, the determining unit 245 acquires a combination associated with the minimum value searched in operation S411, and determines, as the final characteristic points, characteristic point candidates included in the acquired combination (in operation S412). Then, the determining unit 245 terminates the process.

After the description of the process illustrated in FIG. 13, the flow of the process, in which a characteristic point candidate that corresponds to a characteristic point candidate removed by a previous process is removed, is described with reference to FIG. 14. As illustrated in FIG. 14, the face detecting unit 241 acquires the image from the image storage unit 231 (in operation S501). When the face detecting unit 241 detects the face from the image, the face detecting unit 241 activates the process to be performed by the extracting unit 242. The extracting unit 242 extracts, from the image, a plurality of characteristic point candidates that can be the characteristic points such as the pupils, the tip of the nose, the nares, and the mouth corners (in operation S502). Subsequently, the generating unit 243 generates a plurality of combinations of the characteristic point candidates extracted by the extracting unit 242 (in operation S503). In other words, processes in operation S501 to S503 are substantially the same as the processes in operation S401 to S403 of the FIG. 13.

Next, the removing unit 244 selects a single combination from among combinations generated in operation S503 (in operation S504), and adjusts likelihoods of characteristic point candidates included in the selected combination on the basis of the facial orientation (in operation S505). After the process of operation S505, the removing unit 244 removes, from the combination selected in operation S504, a characteristic point candidate whose likelihood is lower than the threshold (in operation S506). Then, the removing unit 244 removes, from the combination selected in operation S504, a characteristic point candidate that corresponds to the characteristic point candidate removed by the previous process (in operation S507). Processes other than the aforementioned processes are substantially the same as the processes illustrated in FIG. 13.

Specifically, the removing unit 244 compares the combination after the process of operation S507 with the model (in operation S508). Next, the removing unit 244 calculates deviations of link lengths from the model, or calculates the deviations of the link lengths between characteristic point candidates included in the combination after the process of operation S507 from the model (in operation S509). Subsequently, the removing unit 244 associates the maximum value among the deviations calculated in operation S509 with the interested combination that is currently processed, and the removing unit 244 stores the maximum value among the deviations calculated in operation S509 and the interested combination that is currently processed (in operation S510). Then, the removing unit 244 determines whether or not the removing unit 244 has completed the process on all the combinations generated in operation S503 (in operation S511). When the process has yet to be performed on at least one of all the combinations as a result of the determination (No in operation S511), the removing unit 244 causes the process illustrated in FIG. 14 to return to the aforementioned process of operation S504 and acquires the next combination. On the other hand, when the process has been completed on all the combinations (Yes in operation S511), the removing unit 244 activates the process to be performed by the determining unit 245. Then, the determining unit 245 searches the minimum value among the maximum values that are among the deviations and have been stored in operation S510 (in operation S512). Then, the determining unit 245 acquires a combination associated with the minimum value searched in operation S512, and determines, as the final characteristic points, characteristic point candidates included in the acquired combination (in operation S513). Then, the determining unit 245 terminates the process.

In the above description, the image analyzing unit 246 acquires the information of the facial orientation. However, the present embodiment is not limited to this. For example, the image analyzing unit 246 removes, from the combination, a characteristic point candidate whose likelihood is lower than the threshold in an environment in which the face is irradiated with high-intensity light. Specifically, when the face detecting unit 241 detects the face, the image analyzing unit 246 divides an image region of the face into a plurality of regions. Then, the image analyzing unit 246 calculates brightness for each of the plurality of regions. For example, the average of luminescence values of pixels included in each of the regions is treated as the brightness. Then, the removing unit 244 adjusts a likelihood of a characteristic point candidate included in a region whose brightness is equal to or higher than a threshold so that the likelihood of the characteristic point candidate is reduced. There is a possibility that a characteristic point that is finally necessary may not be detected from an image that is acquired in the environment in which the face is irradiated with the high-intensity light. Thus, an effect of a characteristic point candidate that is likely to cause a deviation can be removed in advance by reducing the likelihood of the characteristic point candidate included in the region whose brightness is equal to or higher than the threshold.

Effects Obtained in Third Embodiment

As described above, in the third embodiment, after the likelihoods of the characteristic point candidates are adjusted on the basis of the facial orientation, a characteristic point candidate that is included in the combination is removed. According to the third embodiment, it is possible to remove a characteristic point candidate in accordance with reliabilities of the characteristic point candidates, while the reliabilities of the characteristic point candidates are based on an environment in which the object is imaged. According to the third embodiment, when an effect of a characteristic point candidate that is likely to cause a deviation is to be removed in advance, the accuracy of the removal can be improved.

Fourth Embodiment

The method (described in the first embodiment) for removing a characteristic point candidate and the method (described in the third embodiment) for removing a characteristic point candidate can be combined.

Configuration of Image Processing Device (Fourth Embodiment)

The image processing device according to a fourth embodiment has substantially the same constituent blocks as the image processing device according to the third embodiment, or has substantially the same constituent blocks as the image processing device 200 illustrated in FIG. 12. A part of processing functions of the functional blocks of the image processing device according to the fourth embodiment is different from the functional blocks illustrated in FIG. 12 as described below.

Specifically, the removing unit 244 performs a process that is achieved by combining the method (described in the first embodiment) for removing a characteristic point candidate with the method (described in the third embodiment) for removing a characteristic point candidate. For example, the removing unit 244 combines the process illustrated in FIG. 8 with the process illustrated in FIG. 13 and performs the following process. First, the removing unit 244 adjusts the likelihoods of the characteristic point candidates included in each of the combinations generated by the generating unit 243. After the adjustment of the likelihoods, the removing unit 244 removes, from the characteristic point candidates included in the combination, a characteristic point candidate whose likelihood is lower than the threshold.

Next, the removing unit 244 compares the model with the combination from which the characteristic point candidate whose likelihood is lower than the threshold has been removed. Then, the removing unit 244 calculates deviations of the link lengths between the characteristic point candidates included in the combination from the model. Subsequently, the removing unit 244 specifies a link that causes the maximum deviation among the calculated deviations. Then, the removing unit 244 detects a characteristic point candidate that is among the characteristic point candidates relating to the specified link and causes a larger deviation than the other characteristic point candidate relating to the specified link. Then, the removing unit 244 removes the detected characteristic point candidate from the combination, and compares the combination after the removal process with the model. Next, the removing unit 244 recalculates the deviations of the link lengths from the model. The removing unit 244 associates the maximum value among the calculated deviations with the interested combination that is currently processed, and the removing unit 244 stores the maximum value among the calculated deviations and the interested combination that is currently processed. The removing unit 244 performs the aforementioned process on all the combinations generated by the generating unit 243.

In addition, the removing unit 244 can combine the process illustrated in FIG. 8 with the process illustrated in FIG. 14 and perform the following process, for example. The removing unit 244 removes, from the characteristic point candidates included in the combination, a characteristic point candidate whose likelihood is lower than the threshold. After the removal, the removing unit 244 removes a characteristic point candidate that corresponds to a characteristic point candidate removed by a previous process. Then, as described above, the removing unit 244 compares the model with the combination from which the characteristic point candidate whose likelihood is lower than the threshold has been removed and the characteristic point candidate that corresponds to the characteristic point candidate removed by the previous process has been removed, and the removing unit 244 then calculates deviations of the link lengths between the characteristic point candidates included in the combination from the model. Subsequently, the removing unit 244 specifies a link causing the maximum deviation among the calculated deviations and detects a characteristic point candidate that is among characteristic point candidates relating to the specified link and causes a larger deviation than the other characteristic point candidate relating to the specified link. Then, the removing unit 244 removes the detected characteristic point candidate from the combination and compares with the combination after the removal process with the model. Next, the removing unit 244 recalculates the deviations of the link lengths from the model. The removing unit 244 associates the maximum value among the calculated deviations with the interested combination that is currently processed, and the removing unit 244 stores the maximum value among the calculated deviations and the interested combination that is currently processed. The removing unit 244 performs the aforementioned process on all the combinations generated by the generating unit 243.

Process to be Performed by Image Processing Device (Fourth Embodiment)

Figure 15:
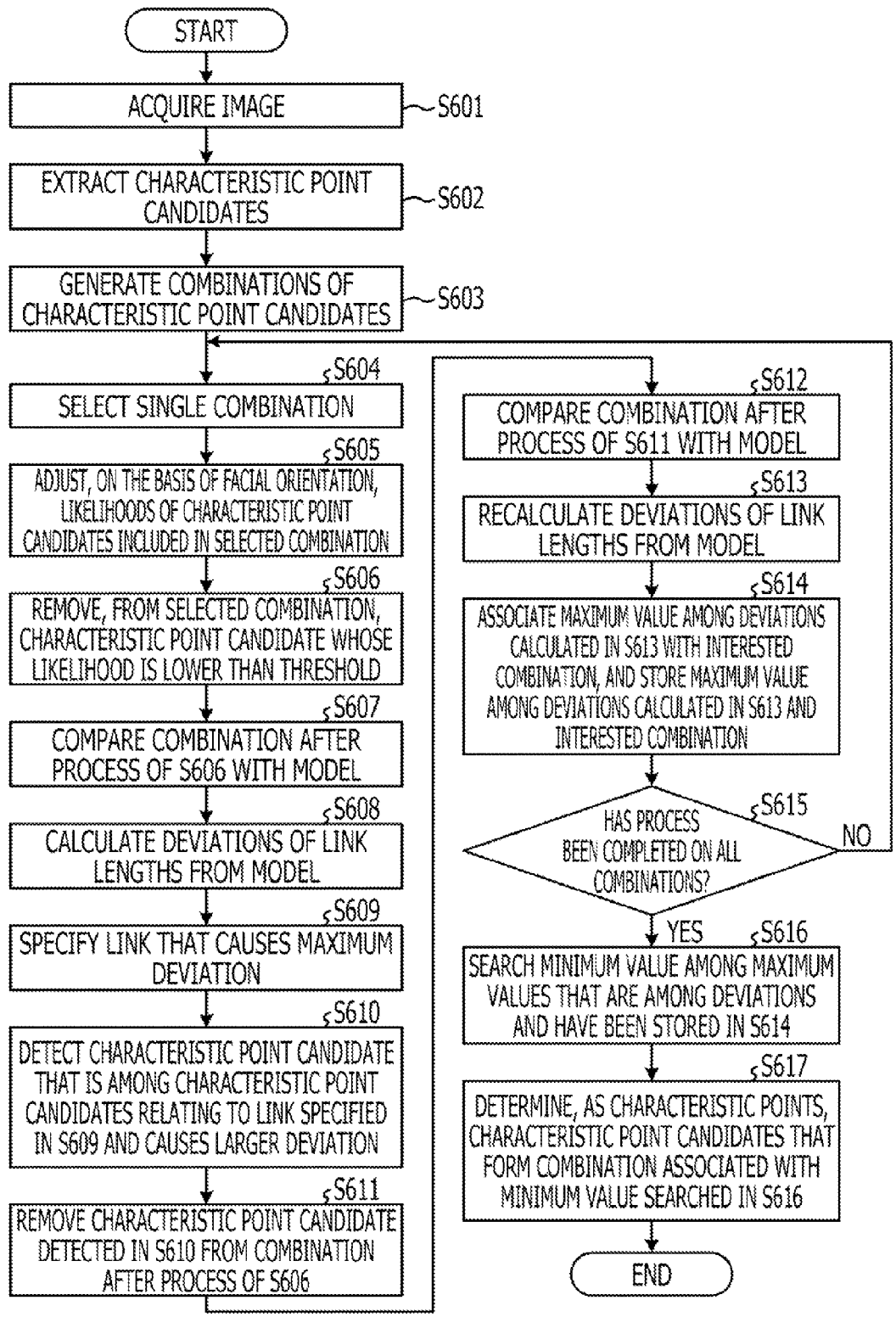
FIG. 15 is a diagram illustrating the flow of a process that is performed by the image processing device according to a fourth embodiment.
Figure 16:
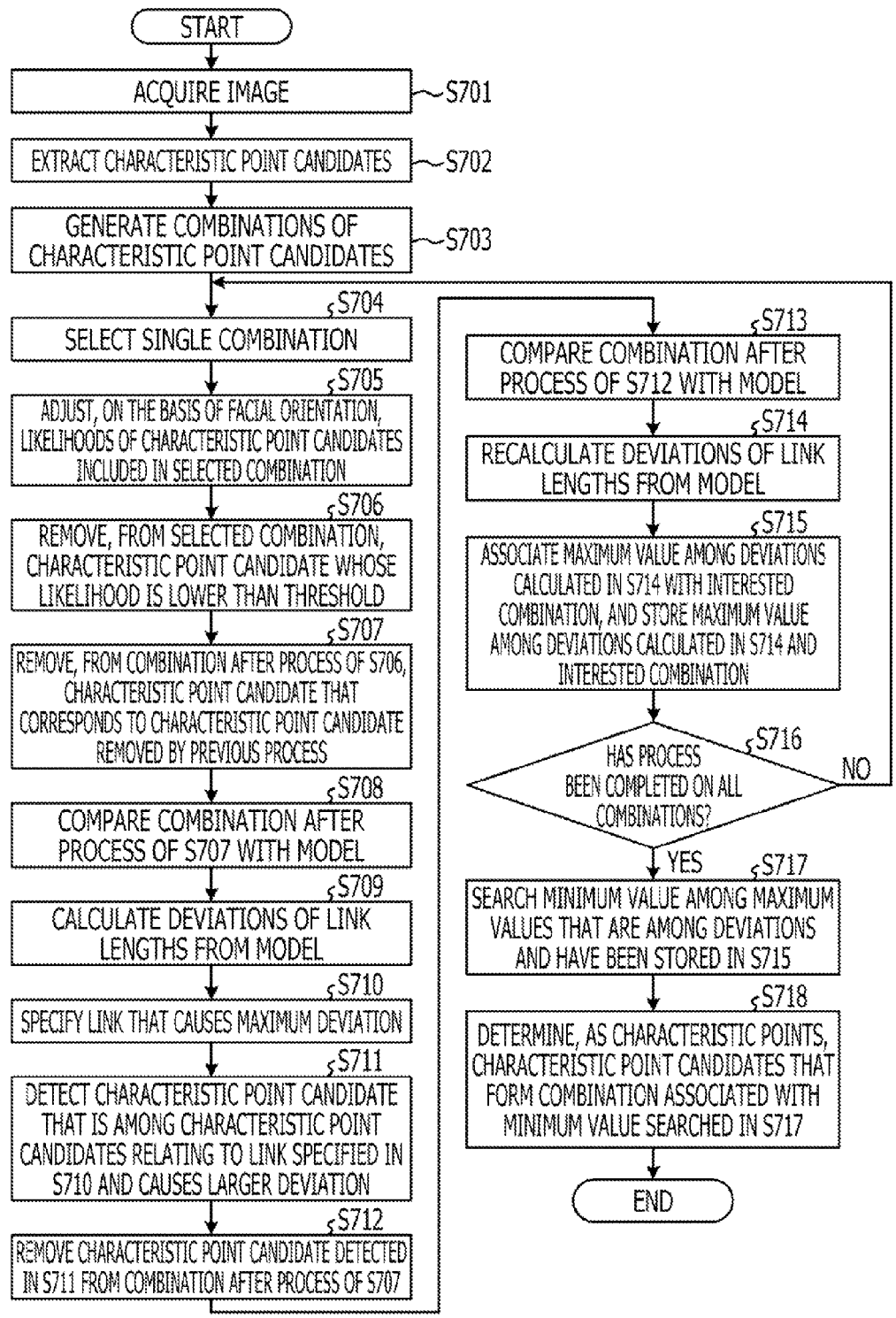
FIG. 16 is a diagram illustrating the flow of a process that is performed by the image processing device according to the fourth embodiment.

The flows of processes that are performed by the image processing device according to the fourth embodiment are described with reference to FIGS. 15 and 16. FIGS. 15 and 16 are diagrams illustrating the flows of the processes that are performed by the image processing device according to the fourth embodiment.

As illustrated in FIG. 15, the face detecting unit 241 acquires the image from the image storage unit 231 (in operation S601). When the face detecting unit 241 detects the face from the image, the face detecting unit 241 activates the process to be performed by the extracting unit 242. The extracting unit 242 extracts, from the image, a plurality of characteristic point candidates that can be the characteristic points such as the pupils, the tip of the nose, the nares, and the mouth corners (in operation S602). Subsequently, the generating unit 243 generates a plurality of combinations of the characteristic point candidates extracted by the extracting unit 242 (in operation S603). In other words, processes in operation S601 to S603 are substantially the same as the processes in operation S101 to S103 of the first embodiment, S201 to S203 of the second embodiment, and S401 to S403 of the third embodiment.

As illustrated in FIG. 15, the process that is performed by the image processing device according to the fourth embodiment is different in the following features from the processes that are performed by the image processing device according to the aforementioned embodiments. Specifically, the removing unit 244 selects a single combination from among combinations generated in operation S603 (in operation S604), and adjusts, on the basis of the facial orientation, likelihoods of characteristic point candidates included in the selected combination (in operation S605). After the process of operation S605, the removing unit 244 removes, from the combination selected in operation S604, a characteristic point candidate whose likelihood is lower than the threshold (in operation S606).

Next, the removing unit 244 compares the combination after the process of operation S606 with the model (in operation S607). Subsequently, the removing unit 244 calculates deviations of link lengths of the combination from the model, or calculates the deviations of the link lengths between the characteristic point candidates included in the combination after the process of operation S606 from the model (in operation S608). Then, the removing unit 244 specifies a link that causes the maximum deviation among the results of the process of operation S608 (in operation S609). Subsequently, the removing unit 244 detects a characteristic point candidate that is among characteristic point candidates relating to the link specified in operation S609 and causes a larger deviation than the other characteristic point candidate relating to the link specified in operation S609 (in operation S610). Then, the removing unit 244 removes, from the combination after the process of operation S606, the characteristic point candidate detected in operation S610 (in operation S611).

Next, the removing unit 244 compares the combination after the process of operation S611 with the model in substantially the same manner as the aforementioned operation S607 (in operation S612). Then, the removing unit 244 recalculates the deviations of the link lengths from the model in substantially the same manner as the aforementioned operation S608 (in operation S613). Then, the removing unit 244 associates the maximum value among the deviations calculated in operation S613 with the interested combination that is currently processed, and the removing unit 244 stores the maximum value among the deviations calculated in operation S613 and the interested combination that is currently processed (in operation S614). Processes other than the aforementioned processes are substantially the same as the aforementioned embodiments.

Specifically, the removing unit 244 determines whether or not the removing unit 244 has completed the process on all the combinations generated in operation S603 (in operation S615). When the process has yet to be performed on at least one of all the combinations as a result of the determination (No in operation S615), the removing unit 244 causes the process illustrated in FIG. 15 to return to the aforementioned process of operation S604 and acquires the next combination. On the other hand, when the process has been completed on all the combinations (Yes in operation S615), the removing unit 244 activates the process to be performed by the determining unit 245. The determining unit 245 searches the minimum value among the maximum values that are among the deviations and have been stored in operation S614 (in operation S616). Then, the determining unit 245 acquires a combination associated with the minimum value searched in operation S616, and determines, as the final characteristic points, characteristic point candidates included in the acquired combination (in operation S617). Then, the determining unit 245 terminates the process.

In addition, as illustrated in FIG. 16, the face detecting unit 241 acquires the image from the image storage unit 231 (in operation S701). When the face detecting unit 241 detects the face from the image, the face detecting unit 241 activates the process to be performed by the extracting unit 242. The extracting unit 242 extracts, from the image, a plurality of characteristic point candidates that can be the characteristic points such as the pupils, the tip of the nose, the nares, and the mouth corners (in operation S702). Subsequently, the generating unit 243 generates a plurality of combinations of the characteristic point candidates extracted by the extracting unit 242 (in operation S703).

As illustrated in FIG. 16, the process that is performed by the image processing device according to the fourth embodiment is different in the following features from the processes that are performed by the image processing device according to the aforementioned embodiments. Specifically, the removing unit 244 selects a single combination from among combinations generated in operation S703 (in operation S704), and adjusts, on the basis of the facial orientation, likelihoods of characteristic point candidates included in the selected combination (in operation S705). After the process of operation S705, the removing unit 244 removes, from the combination selected in operation S704, a characteristic point candidate whose likelihood is lower than the threshold (in operation S706).

Next, the removing unit 244 removes, from the combination after the process of operation S706, a characteristic point candidate that corresponds to a characteristic point candidate removed by a previous process (in operation S707). Subsequently, the removing unit 244 compares the combination after the process of operation S707 with the model (in operation S708). Then, the removing unit 244 calculates deviations of link lengths of the combination from the model, or calculates the deviations of the link lengths between the characteristic point candidates included in the combination after the process of operation S707 from the model (in operation S709).

Next, the removing unit 244 specifies a link that causes the maximum deviation among the results of the process of operation S709 (in operation S710). Subsequently, the removing unit 244 detects a characteristic point candidate that is among characteristic point candidates relating to the link specified in operation S710 and causes a larger deviation than the other characteristic point candidate relating to the link specified in operation S710 (in operation S711). Then, the removing unit 244 removes, from the combination after the process of operation S707, the characteristic point candidate detected in operation S711 (in operation S712).

Next, the removing unit 244 compares the combination after the process of operation S712 with the model in substantially the same manner as the aforementioned operation S708 (in operation S713). Subsequently, the removing unit 244 recalculates the deviations of the link lengths from the model in substantially the same manner as the aforementioned operation S709 (in operation S714). Then, the removing unit 244 associates the maximum value among the deviations calculated in operation S714 with the interested combination that is currently processed, and the removing unit 244 stores the maximum value among the deviations calculated in operation S714 and the interested combination that is currently processed (in operation S715). Processes other than the aforementioned processes are substantially the same as the aforementioned embodiments.

Specifically, the removing unit 244 determines whether or not the removing unit 244 has completed the process on all the combinations generated in operation S703 (in operation S716). When the process has yet to be performed on at least one of all the combinations as a result of the determination (No in operation S716), the removing unit 244 causes the process illustrated in FIG. 16 to return to the aforementioned process of operation S704 and acquires the next combination. On the other hand, when the process has been completed on all the combinations (Yes in operation S716), the removing unit 244 activates the process to be performed by the determining unit 245. The determining unit 245 searches the minimum value among the maximum values that are among the deviations and have been stored in operation S715 (in operation S717). Then, the determining unit 245 acquires a combination associated with the minimum value searched in operation S717, and determines, as the final characteristic points, characteristic point candidates included in the acquired combination (in operation S718). Then, the determining unit 245 terminates the process.

Effects Obtained in Fourth Embodiment

As described above, in the fourth embodiment, a characteristic point candidate that is included in a combination is removed using a plurality of parameters among likelihoods adjusted on the basis of the facial orientation, a result of the previous process, or deviations of link lengths from the model. Thus, according to the fourth embodiment, when an effect of a characteristic point candidate that is likely to cause a deviation is to be removed in advance, the accuracy of the removal can be improved compared to the aforementioned embodiments.

Fifth Embodiment

Other embodiments of the image processing program disclosed herein and the image processing device disclosed herein are described below.

(1) Detection of Characteristic Points of Vehicle

Figure 17:
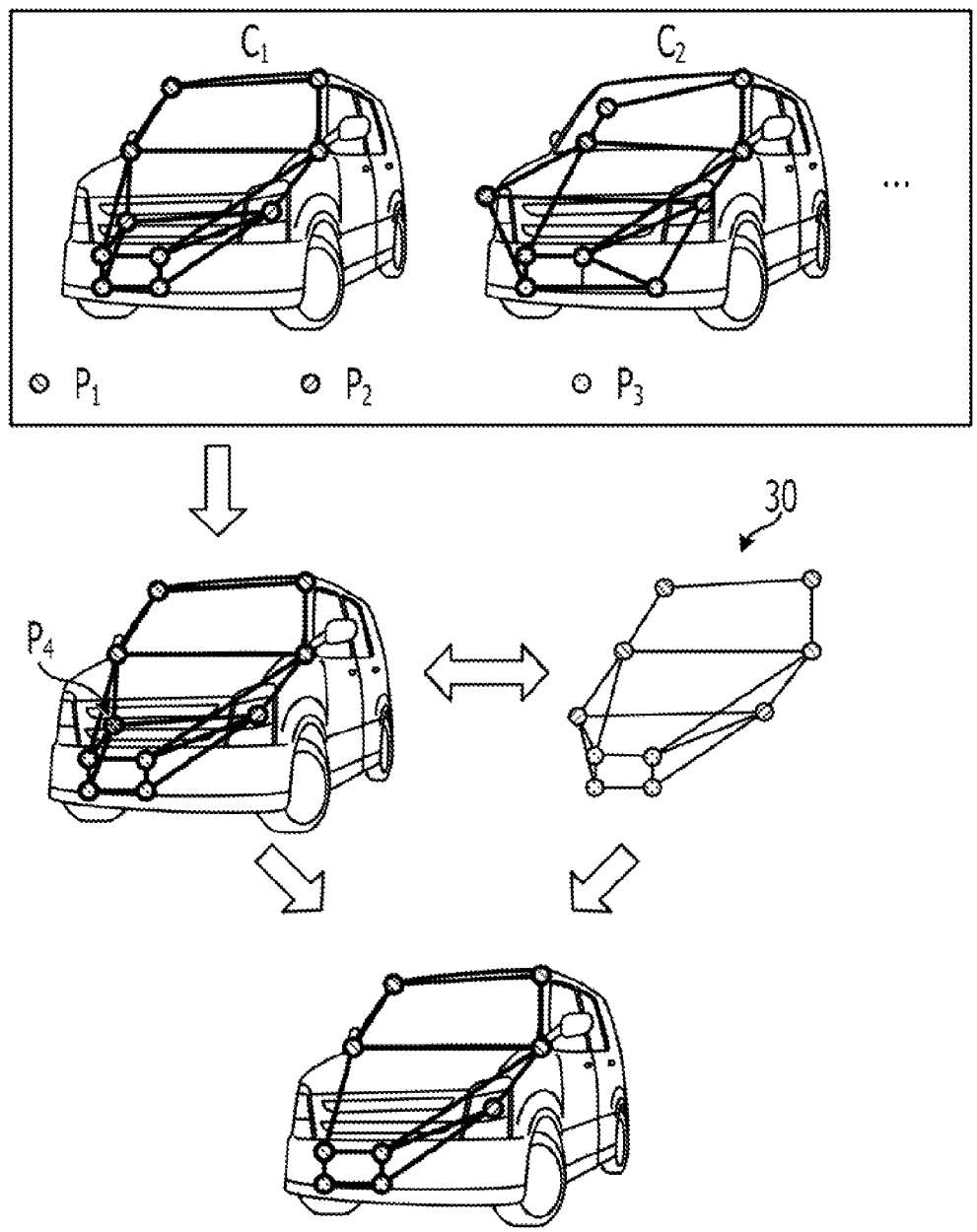
FIG. 17 is a diagram explaining the image processing device according to a fifth embodiment.

The processing functions of the image processing device 200 described above can be applied to the case where the object is a vehicle, for example. FIG. 17 is a diagram explaining the image processing device according to a fifth embodiment. As illustrated in FIG. 17, the image processing device 200 stores a model 30 of dictionary information on a combination of a plurality of authentic characteristic points included in a vehicle. The image processing device 200 acquires characteristic points from an image obtained by imaging the vehicle in substantially the same manner as the aforementioned embodiments.

For example, the image processing device 200 performs a process using an existing technique such as pattern matching and thereby extracts characteristic point candidates $P_1$, $P_2$ and $P_3$ (illustrated in FIG. 17) from the image obtained by imaging the vehicle that is the object. Then, the image processing device 200 generates a plurality of combinations of characteristic point candidates as indicated by symbols $C_1$ and $C_2$ illustrated in FIG. 17, and compares one of the generated combinations with the model 30. Subsequently, the image processing device 200 specifies a link that is among links connecting the characteristic point candidates of the combination and causes the maximum deviation among deviations of the link lengths of the links from the model. Then, the image processing device 200 detects a characteristic point candidate that is among characteristic point candidates relating to the specified link and causes a larger deviation than the other characteristic point candidate relating to the specified link. For example, the image processing device 200 detects a characteristic point candidate $P_4$ illustrated in FIG. 17. Then, the image processing device 200 compares the model 30 with the combination from which the characteristic point candidate $P_4$ has been removed again. The image processing device 200 calculates the deviations of the combination (from which the characteristic point candidate $P_4$ has been removed) from the model 30. Then, the image processing device 200 associates the combination of the characteristic point candidates with the maximum value among the deviations of the link lengths of the links connecting the characteristic point candidates from the model 30, and stores the combination of the characteristic point candidates and the maximum value among the deviations of the link lengths of the links connecting the characteristic point candidates from the model 30. The image processing device 200 performs the aforementioned process on all the generated combinations, and finally determines, as characteristic points, characteristic point candidates included in a combination associated with the minimum value among the maximum values that are among the deviations of the link lengths from the model.

(2) Configuration of Image Processing Device and the Like

For example, the configuration of the functional blocks of the image processing device 200 illustrated in FIG. 1 is a conceptual configuration. Thus, the functional blocks of the image processing device 200 do not need to be physically configured as illustrated in FIG. 1. For example, the extracting unit 242 and the generating unit 243, which are illustrated in FIG. 1, may be functionally or physically integrated with each other. In addition, for example, the removing unit 244 and the determining unit 245, which are illustrated in FIG. 1, may be functionally or physically integrated with each other. For example, all or a part of the functional blocks of the image processing device 200 illustrated in FIG. 1 can be functionally or physically separated or integrated on an arbitrary basis, depending on loads of the blocks and usage states of the blocks.

(3) Image Processing Program

The processes that are performed by the image processing device 200 described in the aforementioned embodiments can be each achieved by causing an electronic device such as an electronic circuit installed in an information processing device or an integrated circuit installed in the information processing device to execute a predetermined program, for example.

Figure 18:
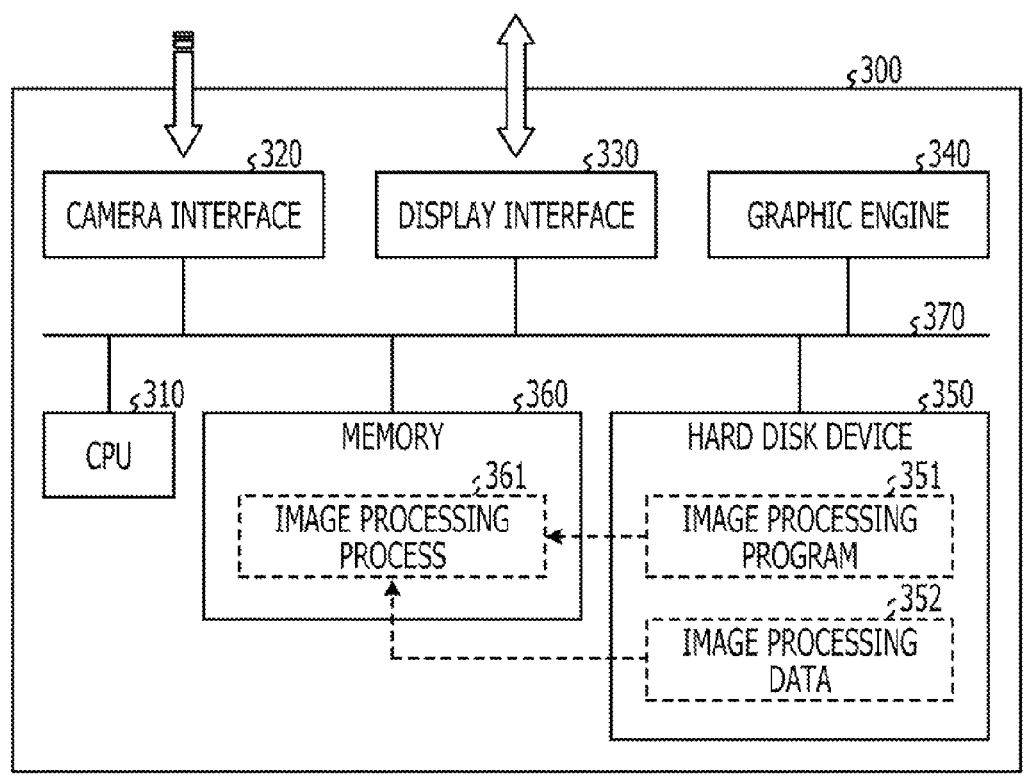
FIG. 18 is a configuration diagram illustrating an example of an electronic device that executes an image processing program.

An example of a computer that executes the image processing program is described below with reference to FIG. 18, while the image processing program achieves substantially the same functions as the processes that are performed by the image processing device 200 described in the aforementioned embodiments. FIG. 18 is a diagram illustrating an example of an electronic device that executes the image processing program.

As illustrated in FIG. 18, an electronic device 300 achieves the various types of the processes that are performed by the image processing device 200. The electronic device 300 includes a central processing unit (CPU) 310 that executes various types of computational processing. As illustrated in FIG. 18, the electronic device 300 includes a camera interface 320 for acquiring an image obtained by a camera and a display interface 330 for transmitting and receiving various types of data between the electronic device 300 and a display. As illustrated in FIG. 18, the electronic device 300 includes a graphic engine 340 that functions as a hardware accelerator.

In addition, as illustrated in FIG. 18, the electronic device 300 includes a hard disk device 350 and a memory 360. The hard disk device 350 stores data, a program and the like, while the program enables the CPU 310 to execute the various types of the processing. The memory 360 may be a random access memory (RAM) or the like, and temporarily stores various types of information. The devices 310 to 360 are connected to each other through a bus 370.

An electronic circuit such as a mirco processing unit (MPU), or an integrated circuit such as an application specific integrated circuit (ASIC) or a field programmable gate array (FPGA), can be used instead of the CPU 310. A semiconductor memory element such as a flash memory can be used instead of the memory 360.

An image processing program 351 and image processing data 352 are stored in the hard disk device 350. The image processing program 351 can achieve substantially the same functions as the functions of the image processing device 200. The image processing program 351 can be distributed through a network to a storage unit of another computer and stored in the storage unit of the other computer, while the other computer is connected to the electronic device 300 through the network so that the electronic device 300 can communicate with the other computer.

The CPU 310 reads the image processing program 351 from the hard disk device 350 and loads the read image processing program 351 into the memory 360, and whereby the image processing program 351 functions as an image processing process 361 as illustrated in FIG. 18. The image processing process 361 causes various types of data such as the image processing data 352 read from the hard disk device 350 to be loaded into regions that are arranged on the memory 360 and to which the data has been assigned. The image processing process 361 causes the various types of the processes to be performed on the basis of the various types of the loaded data.

The image processing process 361 includes the processes that are performed by the controller 240 of the image processing device 200. For example, the image processing process 361 includes the processes described with reference to FIGS. 8, 9, 10, 13, 14, 15 and 16.

The hard disk device 350 does not need to have the image processing program 351 stored therein. For example, the programs may be stored in a portable physical medium such as a flexible disk (FD), a CD-ROM, a DVD disc, a magneto-optical disc or an IC card, while a drive that supports the portable physical medium can be connected to an ECU that has the electronic device 300 installed therein. The electronic device 300 may read the programs from the portable physical medium and execute the programs.

In addition, the programs may be stored in another computer (or a server) that is connected through a public line, the Internet, a LAN, a WAN or the like to the ECU having the electronic device 300 installed therein, for example. The electronic device 300 may read the programs from the other computer (or the server) and execute the programs.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW (ReWritable). An example of communication media includes a carrier-wave signal. The media described above does not include a transitory medium such as a propagation signal.

According to an aspect of the embodiments of the invention, any combinations of one or more of the described features, functions, operations, and/or benefits can be provided.

A combination can be one or a plurality. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An image processing device comprising:
   a processor;
   a storage; and
   a memory which stores a plurality of instructions, which when executed by the processor, cause the processor to execute,
   storing dictionary information of a combination of a plurality of authentic characteristic points in the storage;
   extracting, from an input image, a plurality of characteristic point candidates that are candidates for characteristic points;
   generating a plurality of combinations that each include a plurality of characteristic point candidates that are among the extracted characteristic point candidates, the generating generates a plurality of exclusive combinations that each include a single characteristic point candidate for face parts;
   removing, for each of the combinations of the characteristic point candidates, at least one characteristic point candidate from the plurality of characteristic point candidates included in the combination based on at least one of the dictionary information and information obtained by analyzing the input image; and
   acquiring, for each of the combinations of the characteristic point candidates, results of matching the dictionary information with the combination of which the at least one characteristic point candidate has been removed by the removing from the characteristic point candidates included in the combination, selecting a combination of characteristic point candidates from among the combinations of the characteristic point candidates based on the acquired matching results, and determining, as the characteristic points, the plurality of characteristic point candidates included in the selected combination.

2. The image processing device according to claim 1, wherein the removing performs, for each of the combinations of the characteristic point candidates, matching of a combination of the plurality of authentic characteristic points with the combination of the characteristic point candidates and removes a characteristic point candidate that causes a larger deviation of distances between the characteristic point candidate and the other characteristic point candidates from distances between the authentic characteristic points, as compared to the other characteristic point candidates.

3. The image processing device according to claim 1,
wherein the removing removes, for each of the combinations of the characteristic point candidates, at least one characteristic point candidate based on likelihoods of the characteristic point candidates for the characteristic points and/or information of a characteristic point candidate removed by a previous process, while the likelihoods are obtained by analyzing a current frame that is the input image.

4. The image processing device according to claim 3,
wherein the removing adjusts the likelihoods based on information of an object's orientation obtained by analyzing the current frame and a frame preceding the current frame.

5. A non-transitory computer-readable recording medium having an image processing program recorded thereon, that causes a computer to execute operations, the operations comprising:
   extracting, from an input image, a plurality of characteristic point candidates that are candidates for characteristic points;
   generating a plurality of combinations that each include a plurality of characteristic point candidates that are among the extracted characteristic point candidates, the generating generates a plurality of exclusive combinations that each include a single characteristic point candidate for face parts;
   removing, for each of the combinations of the characteristic point candidates, at least one characteristic point candidate from the plurality of characteristic point candidates included in the combination based on at least one of dictionary information of a combination of a plurality of authentic characteristic points and information obtained by analyzing the input image;
   acquiring, for each of the combinations of the characteristic point candidates, results of matching of the dictionary information with the combination of which the at least one characteristic point candidate has been removed from the characteristic point candidates included in the combination; and
   selecting a combination of characteristic point candidates from among the combinations of the characteristic point candidates based on the matching results, and determining, as the characteristic points, the characteristic point candidates included in the selected combination.

6. The non-transitory computer-readable medium according to claim 5,
wherein in the removing of the at least one characteristic point candidate, matching of the combination of the plurality of authentic characteristic points with each of the combinations of the characteristic point candidates is performed, a characteristic point candidate that causes a larger deviation of distances between the characteristic point candidate and the other characteristic point candidates from distances between the authentic characteristic points, as compared to the other characteristic point candidates, is removed from the combination.

7. The non-transitory computer-readable medium according to claim 5,
wherein in the removing of at least one characteristic point candidate, at least one characteristic point candidate is removed for each of the combinations of the characteristic point candidates based on the basis of likelihoods of the characteristic point candidates for the characteristic points and/or information of a characteristic point candidate removed by a previous process, while the likelihoods are obtained by analyzing a current frame that is the input image.

8. The non-transitory computer-readable medium according to claim 7,
wherein in the removing of the at least one characteristic point candidate, the likelihoods are adjusted based on information of an object's orientation obtained by analyzing the current frame and a frame preceding the current frame.

9. An image processing method comprising:
   extracting, from an input image, a plurality of characteristic point candidates that are candidates for characteristic points;
   generating a plurality of combinations that each include a plurality of characteristic point candidates that are among the extracted characteristic point candidates, the generating generates a plurality of exclusive combinations that each include a single characteristic point candidate for face parts;
   removing, for each of the combinations of the characteristic point candidates, at least one characteristic point candidate from the plurality of characteristic point candidates included in the combination based on at least one of dictionary information of a combination of a plurality of authentic characteristic points and information obtained by analyzing the input image;
   acquiring, for each of the combinations of the characteristic point candidates, results of matching of the dictionary information with the combination of which the at least one characteristic point candidate has been removed from the characteristic point candidates included in the combination; and
   selecting, by a computer processor, a combination of characteristic point candidates from among the combinations of the characteristic point candidates based on the matching results, and determining, as the characteristic points, the characteristic point candidates included in the selected combination.

\* \* \* \* \*